(12) United States Patent
Bratkovski

(10) Patent No.: US 8,280,054 B2
(45) Date of Patent: Oct. 2, 2012

(54) SCRAMBLING AND DESCRAMBLING SYSTEMS FOR SECURE COMMUNICATION

(75) Inventor: Alexandre M. Bratkovski, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 727 days.

(21) Appl. No.: 12/387,352

(22) Filed: Apr. 30, 2009

(65) Prior Publication Data

US 2010/0277791 A1    Nov. 4, 2010

(51) Int. Cl.
*H04L 21/00* (2006.01)
(52) U.S. Cl. ............ 380/256; 380/270; 380/31; 380/54; 359/276; 359/245; 359/325
(58) Field of Classification Search .................... 380/54, 380/210, 219, 238–239, 256; 359/325, 245, 359/279, 237, 239, 254, 251, 252, 255, 322, 359/323; 385/2, 3, 8; 345/49, 84; 356/245, 356/454, 519; 372/26, 27, 28, 12
See application file for complete search history.

(56) References Cited

U.S. PATENT DOCUMENTS

| 6,907,124 | B1 * | 6/2005 | Gluckstad ..................... 380/205 |
| 7,474,456 | B2 * | 1/2009 | Wang et al. ................... 359/315 |
| 2008/0239462 | A1 * | 10/2008 | Kuekes et al. ................ 359/299 |
| 2008/0296710 | A1 * | 12/2008 | Tonucci ........................ 257/421 |
| 2011/0007384 | A1 * | 1/2011 | Betin et al. .................... 359/333 |

* cited by examiner

*Primary Examiner* — Jung Kim
*Assistant Examiner* — Tri Tran

(57) ABSTRACT

Various embodiments of the present invention are directed to scrambling-descrambling systems for encrypting and decrypting electromagnetic signals transmitted in optical and wireless networks. In one aspect, a system (1302) for scrambling electromagnetic signals comprises a first electronically reconfigurable electro-optical material (1402) positioned to receive a beam of electromagnetic radiation including one or more electromagnetic signals encoding data. The beam is transmitted through the electro-optical material (1402) and a two-dimensional speckled pattern (1410) is introduced into the cross-section of the beam such that data encoded in the one or more electromagnetic signals is scrambled. System embodiments also include a system (1304) for descrambling scrambled electromagnetic signals, the systems comprising a second electronically reconfigurable electro-optical material (1502) configured to remove the two-dimensional speckled pattern from the beam revealing the one or more electromagnetic signals encoding the data.

15 Claims, 25 Drawing Sheets

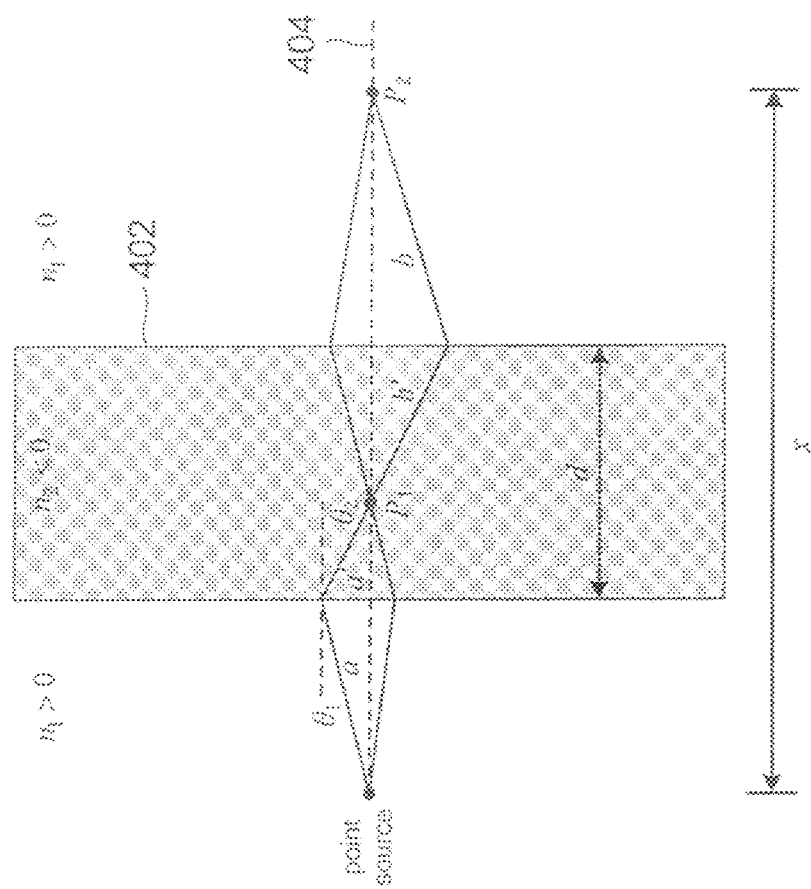
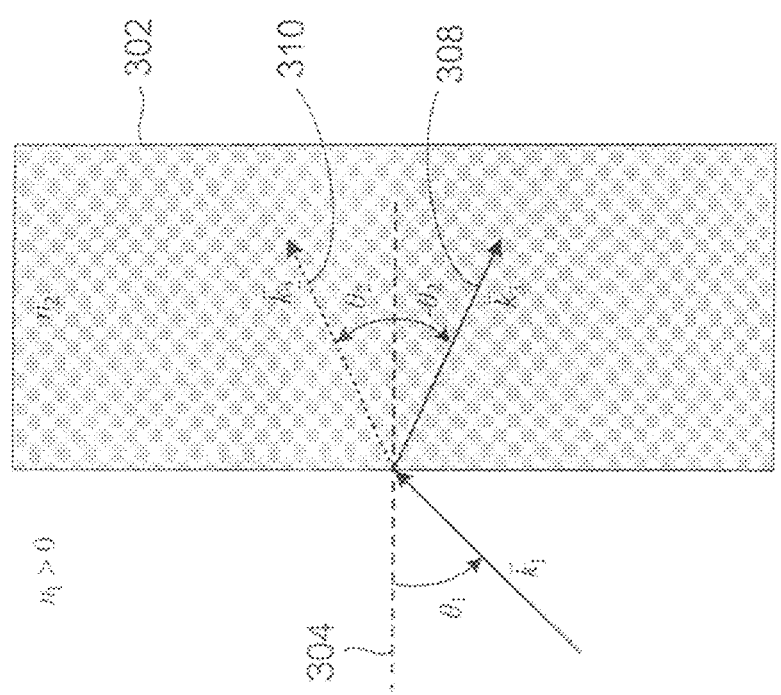
Figure 4
Figure 3

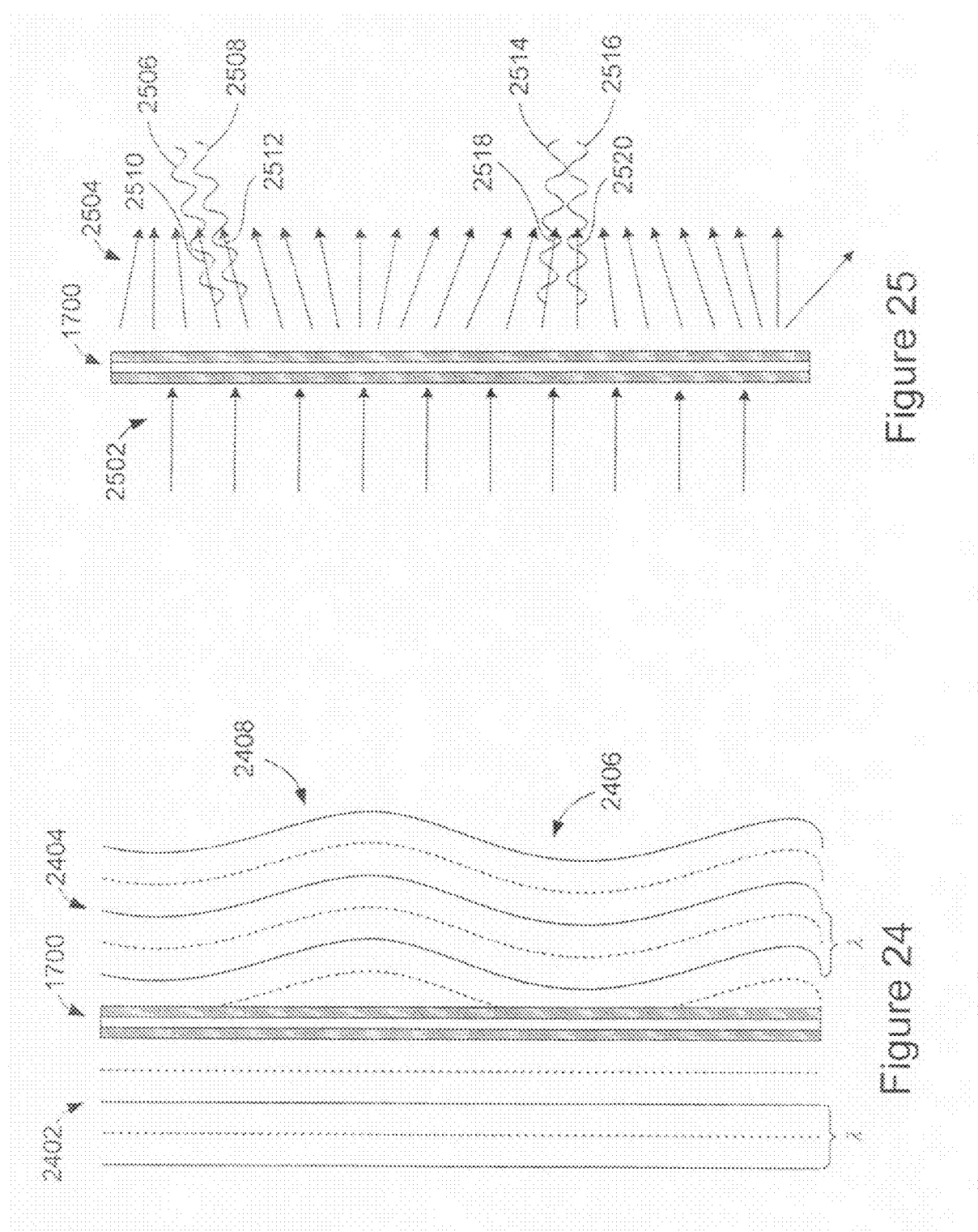

SCRAMBLING AND DESCRAMBLING SYSTEMS FOR SECURE COMMUNICATION

TECHNICAL FIELD

Embodiments of the present invention relate to secure systems for transmitting information, and, in particular, to systems that scramble and descramble information sent between communicating parties.

BACKGROUND

Governments, businesses, financial institutions, and other goods and services providers provide high speed information transmitting services that enable users to rapidly access information, exchange information, and conduct business. The information transmission services include web applications, electronic mail, electronic file transfers, and other electronic services that enable users to electronically transmit vital information over electronic and optical transmission channels, resulting in millions of electronic transactions conducted every day. However, rapid development of methods and systems for transmitting information has also created an environment for malicious users to target governments, businesses, financial institutions, goods and services providers, and users. In particular, criminals, criminal organizations, terrorists, and adversarial governments have developed innovative devices, destructive routines, and computer programs (e.g., viruses, worms, and Trojan horses) for intercepting vital information transmitted over conventional transmission channels, stealing vital information and funds and eves dropping on users engaged in transactions.

As a result of the rise in these criminal activities, an electronic security ("e security") industry has emerged. E-security companies develop computer programs to actively monitor computer-system content and to examine computer systems for potentially destructive routines and computer programs. Network-intrusion-detection applications and systems have been developed to monitor network traffic and to alert a system administrator when a malicious user is attempting to gain unauthorized access to a computer system. Complex algorithms based on cryptographic methods have been developed to encrypt data sent from one location and decrypt the data when the data is received at a receiving location.

Although computer programs and routines have been developed to prevent many kinds of malicious attacks on computer system users, designers, manufacturers, and users have been slow to develop hardware-based systems that prevent malicious attacks.

BRIEF DESCRIPTION OF THE DRAWINGS

FIG. 3 shows refraction of rays of electromagnetic radiation in an ordinary right-handed medium and a negative index metamaterial.

FIG. 4 shows focusing properties of a metamaterial slab for electromagnetic radiation emanating from a point source.

FIG. 24 shows a side view of a beam of monochromatic electromagnetic radiation entering and emerging from the electro-optical material, shown in FIG. 17, in accordance with embodiments of the present invention.

FIG. 25 shows a slice through incident and output rays associated with a coherent beam of electromagnetic radiation transmitted through the electro-optical material, shown in FIG. 17, accordance with embodiments of the present invention.

DETAILED DESCRIPTION

Figure 1A:
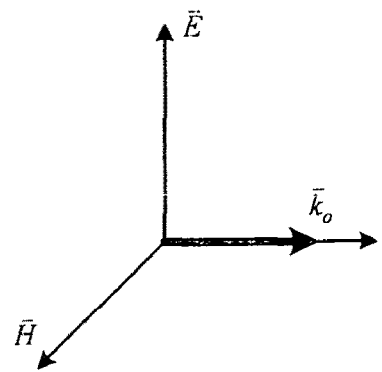
FIGS. 1A-1B show wave and Poynting vector directions for electromagnetic waves propagating in an ordinary right-handed medium.

Various embodiments of the present invention are directed to scrambling-descrambling systems for encrypting and decrypting electromagnetic signals transmitted in optical and wireless networks. System embodiments are implemented with crossbar controllable, electro-optical media in combination with multimode channels. A first electro-optical medium is operated to scramble data encoded in substantially coherent electromagnetic signals at the data source by converting the electromagnetic signals into an unintelligible, two-dimensional speckle pattern transmitted in free space or over a multimode channel to a data destination. At the data destination, a second electro-optical medium is operated to descramble the speckle pattern in order to obtain the original coherent electromagnetic signals for processing.

In certain embodiments, the electro-optical media can be a nanowire crossbar, and in other embodiments, the electro-optical media can be a negative index material crossbar. A general description of negative index materials is provided in a first subsection, and a general description of the operation of negative index material crossbars is provided in a second subsection. Resonant elements of the negative index material crossbars are described in a third subsection. Embodiments of the present invention are described in a fourth subsection.

In the following description, the term "optical" refers to classical and/or quantized electromagnetic radiation having wavelengths in the visible and non-visible portions of the electromagnetic spectrum.

Negative Index Materials

Negative index materials ("NIMs"), also called metamaterials, are materials with optical properties resulting from the structure of the material rather than from the chemical composition of the material. Natural materials have positive permeability, $\mu$, and may have positive or negative dielectric permittivity $\in$, depending on the type of conductivity of the material and frequency ranges. In contrast, NIMs have simultaneously negative $\in$ and $\mu$ for certain portions of the electromagnetic spectrum, which results in optical properties that are different from those of ordinary composite materials. The optical properties of NIMs can be appreciated by comparing and contrasting the optical properties of NIMs with the optical properties of ordinary composite materials, as described in *Electrodynamics of Metamaterials*, by A. K. Sarychev and V. M. Shalaev (World Scientific, New York, 2007). For example, assuming the temporal evolution of the phase of the wave is $\exp(j\omega t)$, $j=\sqrt{-1}$, and $\omega$ is the angular frequency, consider Maxwell's first-order differential equations for an electromagnetic wave propagating in a homogeneous material with a time harmonic field:

$$\nabla \times \vec{E} = -j\omega\mu\vec{H}$$

$$\nabla \times \vec{H} = j\omega\in\vec{E}$$

where $\vec{E}$ is the electric field component, $\vec{H}$ is the magnetic field component. The solutions of these equations are the plane-wave fields:

$$\vec{E} = \vec{E}_0 \exp(-j\vec{k}_o \cdot \vec{r})$$

$$\vec{H} = \vec{H}_0 \exp(-j\vec{k}_o \cdot \vec{r})$$

Figure 1B:
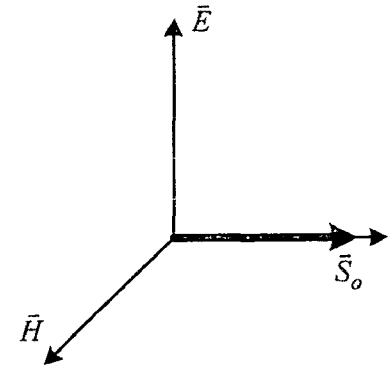
Figure 2A:
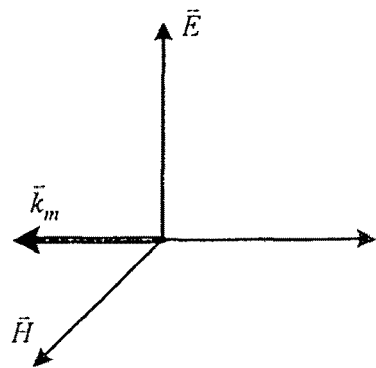
FIGS. 2A-2B show wave and Poynting vector directions for electromagnetic waves propagating in a negative index metamaterial.
Figure 2B:
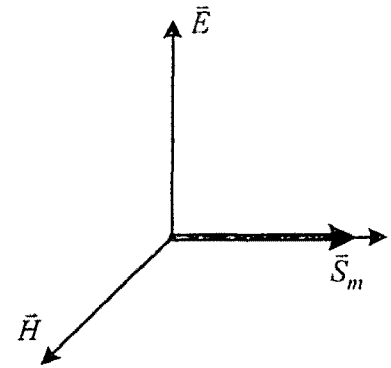

Substituting the plane-wave equations into Maxwell's first order differential equations gives the relations:

$$\vec{k}_o \times \vec{E} = \omega\mu\vec{H}$$

$$\vec{k}_o \times \vec{H} = -\omega\in\vec{E}$$

where $\vec{k}_o$ is a wavevector indicating the direction an electromagnetic wave propagates within a composite material. FIG. 1A shows the spatial relationship and relative orientation of the vectors $\vec{E}$, $\vec{H}$, and $\vec{k}_o$ and reveals that for an ordinary composite material with positive $\in$ and $\mu$, the vectors $\vec{E}$, $\vec{H}$, and $\vec{k}_o$ form an orthogonal, right-handed system of vectors. In addition, the direction of the time-averaged energy flux of the electromagnetic wave is given by the real component of the Poynting vector:

$$\vec{S}_o = \frac{1}{2}\text{Re}(\vec{E} \times \vec{H}^*)$$

which, as shown in FIG. 1B, reveals that the vectors $\vec{E}$, $\vec{H}$, and $\vec{S}_o$ also form an orthogonal, right-handed vector system. In other words, FIGS. 2A and 2B, show that for an electromagnetic wave propagating through a ordinary composite material, the propagation direction identified by the wavevector $\vec{k}_o$ and the direction of the energy carried by the electromagnetic wave identified by the Poynting vector $\vec{S}_o$ are the same.

On the other hand, consider NIMs, where $\in<0$ and $\mu<0$. Maxwell's first order differential equations give the relations:

$$\vec{k}_m \times \vec{E} = -\omega|\mu|\vec{H}$$

$$\vec{k}_m \times \vec{H} = \omega|\in|\vec{E}$$

where $\vec{k}_m$ is a wavevector indicating the direction the phase the electromagnetic wave propagates in a NIM. As shown in FIG. 2A, and in contrast to the composite materials shown in FIG. 1A, for NIMs, the vectors $\vec{E}$, $\vec{H}$, and $\vec{k}_m$ form an orthogonal, left-handed system of vectors. In other words, comparing the directions of the wavefronts represented by the wavevectors $\vec{k}_c$ and $\vec{k}_m$ shown in FIGS. 1A and 2A, respectively, reveals that electromagnetic waves propagate backwards in NIMs for the same orientation of the vectors $\vec{E}$ and $\vec{H}$. Thus, NIMs are also referred to as "left-handed media" or "backward media." However, as shown in FIG. 2B, the Poynting vector $\vec{S}_m$ in a metamaterial is unaffected by the change of sign of $\in$ and $\mu$, and the vectors $\vec{E}$, $\vec{H}$, and $\vec{S}_m$ still form an orthogonal, right-handed system of vectors in a left-handed medium. Therefore, in NIMs, energy and wavefronts travel in opposite directions.

Now, consider the refraction of an incident ray at the interface between ordinary and left-handed media. Based on the properties of electromagnetic waves travelling in NIMs described above, it follows that, unlike refraction observed in ordinary media, the angles-of-incidence and refraction have opposite signs. Snell's law in NIMs becomes:

$$\frac{\sin\theta_1}{\sin\theta_2} = \frac{-|k_2|}{|k_1|} \equiv \frac{n_2}{n_1} < 0,$$

where the subscripts 1 and 2 identify ordinary and left-handed media, respectively. Assuming $n_1>0$, from Snell's law it follows that $n_2<0$. That is, the sign of the square root in the definition of the refractive index is chosen to be negative:

$$n_2 = -\sqrt{\in\mu} < 0$$

Hence the term "negative index material" is used to refer to materials having both negative $\in$ and $\mu$.

FIG. 3 shows refraction of rays of electromagnetic radiation in an ordinary right-handed medium and a negative index metamaterial. Dashed line 304 represents a surface normal extending perpendicular to the surface of a medium 302. As shown in FIG. 3, angle $\theta_1$ and wavevector $\vec{k}_1$ 306 represent the angle-of-incidence and direction of a ray of electromagnetic radiation propagating through an ordinary medium with index of refraction $n_1>0$ and is incident on the medium 302. Angle $-\theta_2$ and wavevector $\vec{k}_3$ 308 represent the angle-of-refraction and direction of a refracted ray of electromagnetic radiation propagating within the medium 302 with refractive index $n_2<0$, while angle $\theta_2$ and wavevector $\vec{k}_2$ 310 represent the angle-of-refraction and direction of a refracted ray of electromagnetic radiation propagating within the medium 302 with refractive index $n_2>0$, where $|n_2|>n_1$. Thus, for the medium 302 with a refractive index of $n_2<0$, the incident ray 306 and the refracted ray 308 lie on the same side of the surface normal 304, and for the medium 302 with a refractive index of $n_2>0$, the incident ray 306 and the refracted ray 310 lie on opposite sides of the surface normal 304.

Tracing the paths of optical rays through conventional concave and convex lens made of left-handed media reveals that concave lenses become convergent and convex lens become divergent, thus reversing the behavior of lenses comprising ordinary media. FIG. 4 shows focusing properties of a slab 402 composed of a NIM for electromagnetic radiation emanating from a point source. For incident rays paraxial to an optical axis 404, Snell's law gives:

$$|n| = \frac{|n_2|}{n_1} = \frac{|\sin\theta_1|}{|\sin\theta_2|} \square \frac{|\tan\theta_1|}{|\tan\theta_2|} = \frac{a'}{a} = \frac{b'}{b}$$

where n is the refractive index $n_2$ of the slab 402 relative to refractive index of the surrounding medium $n_1$. As shown in FIG. 4, rays emanating from the point source are focused at two points $P_1$ and $P_2$. Point $P_1$ lies inside the slab 402 and point $P_2$ lies on the side of the slab 402 opposite the point source. The distance from the point source to the second focusing point $P_2$ is given by:

$$x = a + a' + b' + b = d + \frac{d}{|n|}$$

where d is the width of the slab. When n equals −1, the focusing effect is not restricted to paraxial rays, because in this case $|\theta_1|$ equals $|\theta_2|$ for any angle-of-incidence. In fact, when n equals −1, all rays emanating from the point source are focused at two points, the latter point $P_2$ being at a distance 2d from the point source. Thus, unlike slabs comprising ordinary composite materials, slabs composed of NIMs can be configured to focus electromagnetic radiation.

Negative Index Material Crossbars

Figure 5:
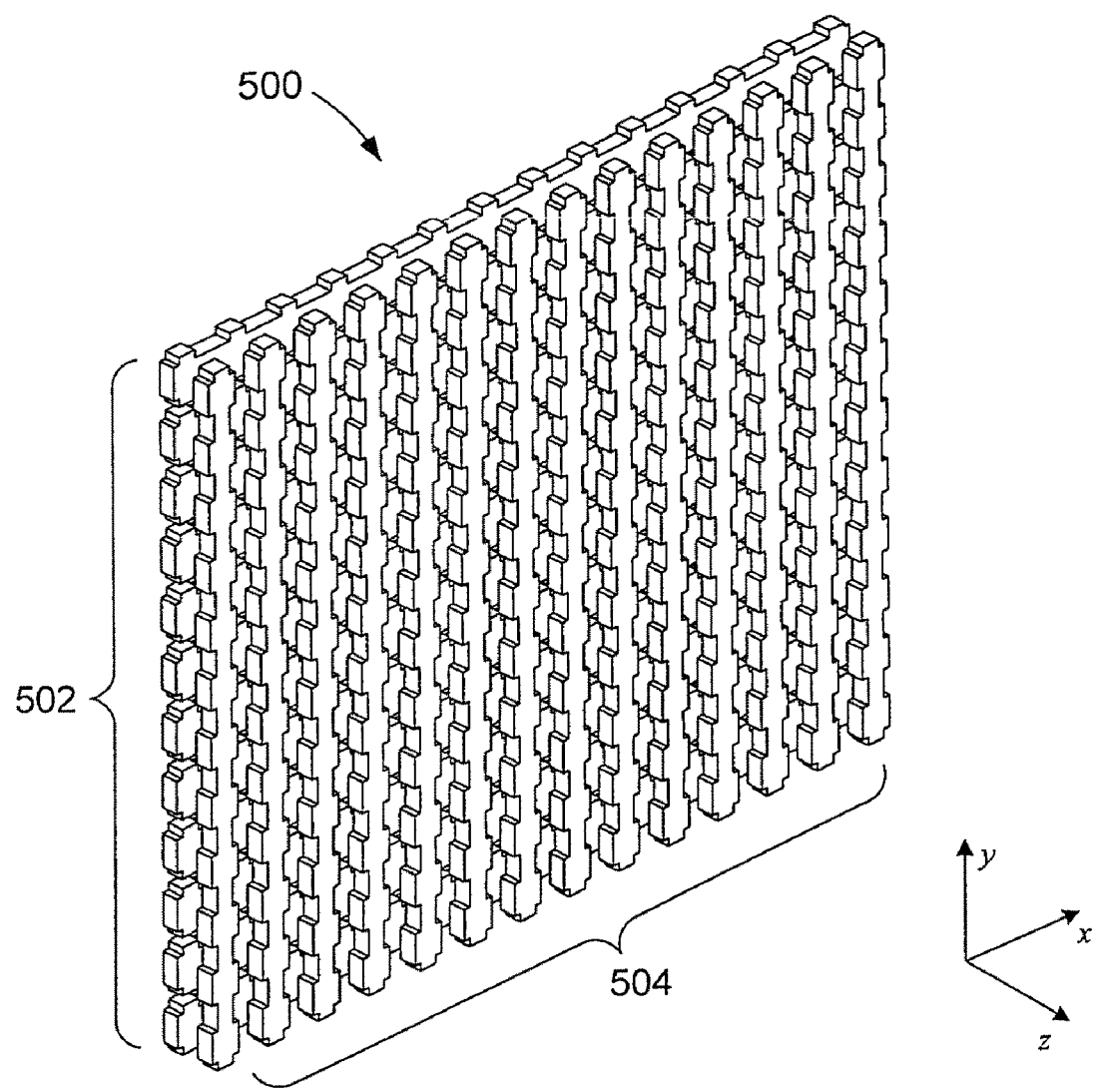
FIG. 5 shows an isometric view of a negative index material crossbar configured in accordance with embodiments of the present invention.

FIG. 5 shows an isometric view of a NIM crossbar 500 configured in accordance with embodiments of the present invention. The NIM crossbar 500 comprises a first layer of non-crossing, approximately parallel nanowires 502 that are overlain by a second layer of non-crossing, approximately parallel nanowires 504. The nanowires of the first layer 502 run substantially parallel to the x-axis and are approximately perpendicular, in orientation, to the nanowires of the second layer 504, which run substantially parallel to the y-axis, although the orientation angle between the nanowires of the layers 502 and 504 may vary. The two layers of nanowires form a lattice, or crossbar, with each nanowire of the second layer 504 overlying all of the nanowires of the first layer 502 and coming into close contact with each nanowire of the first layer 502 at nanowire intersections called "resonant elements" that represent the closest contact between two nanowires.

Figure 6:
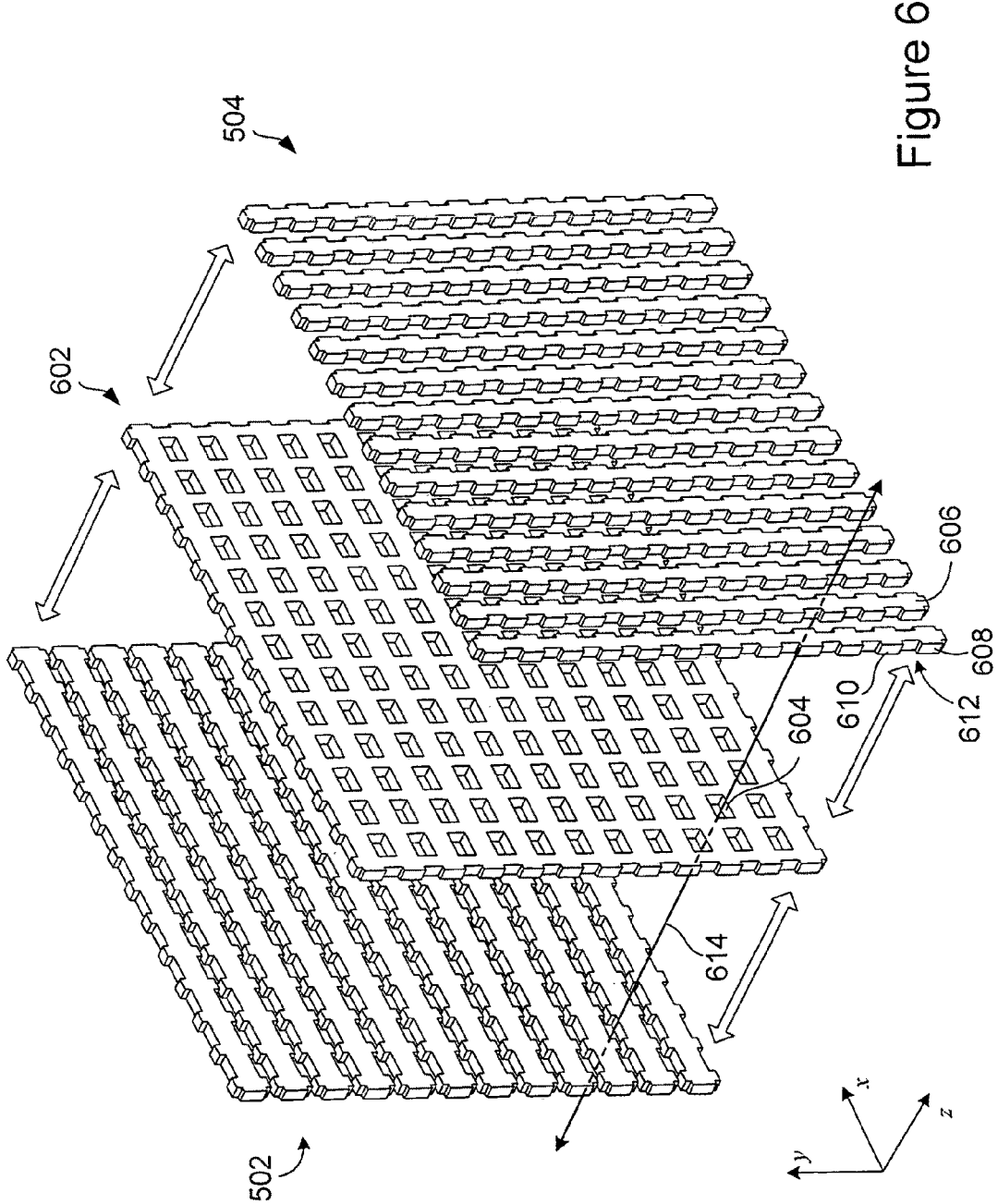
FIG. 6 shows an exploded isometric view of the negative index material crossbar configured in accordance with embodiments of the present invention.

FIG. 6 shows an exploded isometric view of the NIM crossbar 500 configured in accordance with embodiments of the present invention. FIG. 6 reveals an intermediate layer 602 sandwiched between the first layer of nanowires 502 and the second layer of nanowires 504. The intermediate layer 602 is a continuous layer including an array of regularly spaced holes, such as hole 604. In certain embodiments, as shown in FIG. 6, the holes can be rectangular, and in other embodiments, the holes can be square. The nanowires in the first layer 502 have relatively larger cross-sectional dimensions than the nanowires comprising the second layer 504. FIG. 6 also reveals that the nanowires in both the first and second layers 502 and 504 are configured with substantially regularly spaced protuberances called "fingers" that are separated by notches. For example, nanowire 606 includes fingers 608 and 610 separated by a notch 612. The fingers of nanowires of one layer are approximately parallel to the length of the nanowires in the other layer, and the fingers of adjacent nanowires within the same layer are also substantially aligned within the first and second layers 502 and 504, and the holes in the intermediate layer 602 are substantially aligned with the notches between fingers in the first and second layers 502 and 504. For example, line 614 passes through notches of adjacent nanowires in the first layer 502 passes through the hole 604 in the intermediate layer 602 and passes through notches in adjacent nanowires in the second layer 504.

Figure 7:
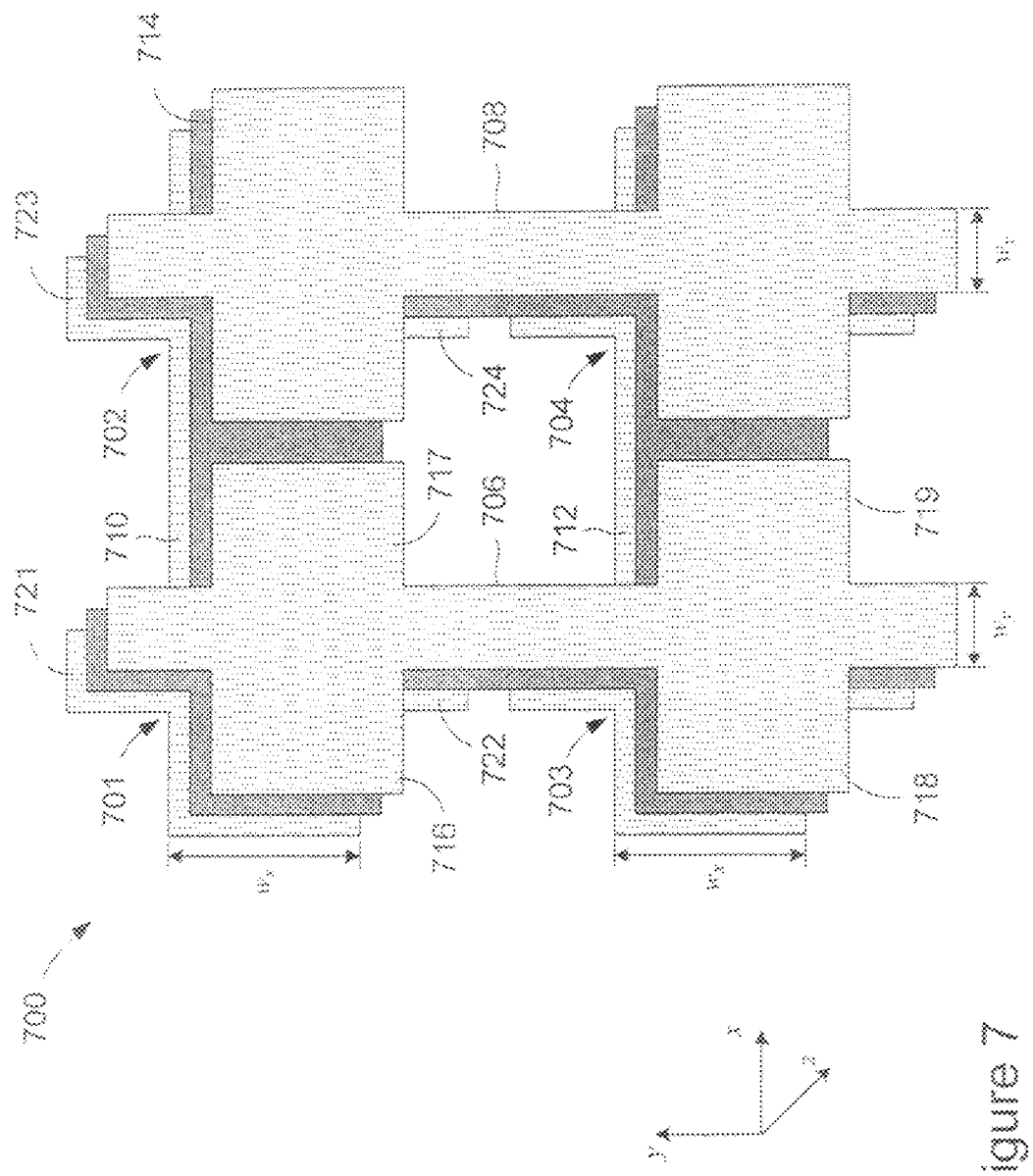
FIG. 7 shows an isometric view of an enlargement of a four adjacent resonant elements of the negative index material crossbar configured in accordance with embodiments of the present invention.

FIG. 7 shows an isometric view of an enlargement 700 of a four adjacent resonant elements 701-704 of the NIM crossbar 500 configured in accordance with embodiments of the present invention. The resonant elements 701-704 are formed by nanowires 706 and 708 extending in the y-direction overlaying portions of nanowires 710 and 712 extending in the x-direction. The nanowires 706 and 708 are separated from the nanowires 710 and 712 by a portion 714 of intermediate layer 602. The width $w_x$ of the nanowires 710 and 712 in the first layer 502 is larger than the width $w_y$ of the nanowires 706 and 708 in the second layer 504. The nanowires 706 and 708 include fingers protruding in the x-direction, such as fingers 716-719 of nanowire 706, and nanowires 710 and 712 include fingers protruding in the y-direction, such as fingers 721-724 of nanowire 710. The fingers of adjacent nanowires lying in the same layer are separated by gaps. As shown in FIG. 7, each of the resonant elements 701-704 includes two fingers of a nanowire in the first layer 502 and two fingers of a nanowire in the second layer 504. For example, resonant element 701 includes fingers 716 and 717 of nanowire 706 and fingers 721 and 722 of nanowire 710.

Figure 8:
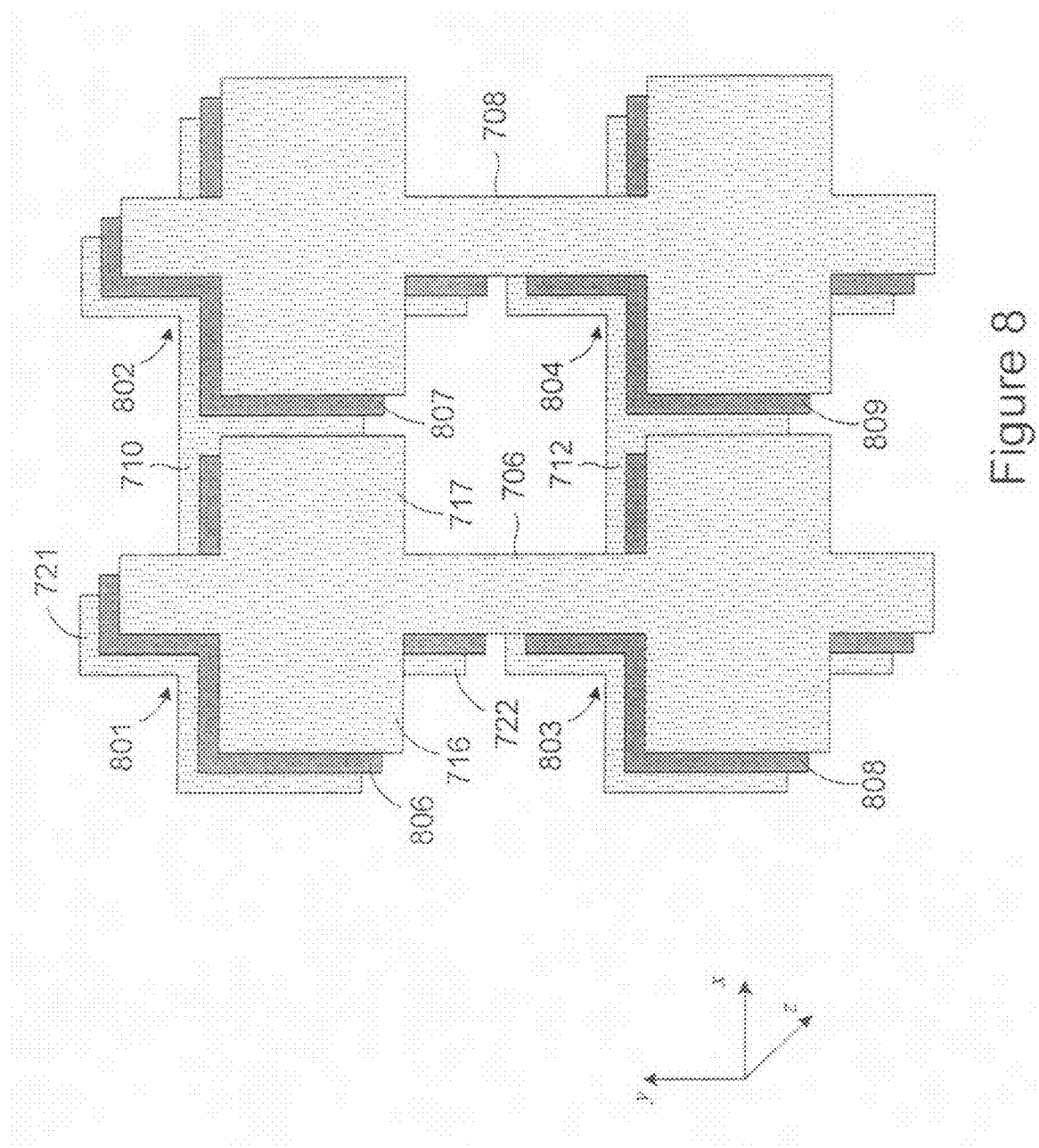
FIG. 8 shows an isometric view of an enlargement of four adjacent resonant elements of a negative index material crossbar configured in accordance with embodiments of the present invention.

In other embodiments, the intermediate layer 602 may be composed of discrete portions of a material lying within each resonant element. FIG. 8 shows an isometric view of an enlargement 800 of four adjacent resonant elements 801-804 of a NIM crossbar configured in accordance with embodiments of the present invention. The resonant elements 801-804 include intermediate plus-shaped layers 806-809, respectively, disposed within the region between the fingers of nanowires 706 and 708 overlaying nanowires 710 and 712. As shown in FIG. 8, adjacent plus-shaped layers 806-809 are separated by gaps, and each plus-shaped layer fills the space between the nanowire of one layer and the fingers of a nanowire in another layer. For example, plus-shaped layer 806 is configured to fill the space between fingers 721 and 722 and nanowire 706 and fill the space between fingers 716 and 717 and nanowire 710.

Although individual nanowires shown in FIG. 5-8 have rectangular cross sections, nanowires can also have square, circular, elliptical, or more complex cross sections dictated by design of supporting a magneto-plasmon resonance and related NIM behavior over a particular wavelength or frequency range of interest of the electromagnetic spectrum. The nanowires may be configured to have many different widths or diameters and aspect ratios or eccentricities ranging from approximately 1/5 to approximately 1/20 of the wavelength of incident electromagnetic radiation or ranging from approximately 20 nm to approximately 200 nm. Although the fingers shown in FIGS. 5-8 have clearly defined edges, in other embodiments, the fingers may have rounded edges. The term "resonant element" may refer to crossbars having one or more layers of sub-microscale wires, microscale wires, or wires with larger cross-sectional dimensions, in addition to nanowires. The nanowires can be comprised of silver ("Ag"), gold ("Au"), copper ("Cu"), aluminum ("Al"), platinum ("Pt"), or another suitable electronically conducting metal, or the nanowires can be composed of heavily doped semiconductors depending on the frequency of incident electromagnetic radiation.

The crossbar layers can be fabricated by mechanical nanoimprinting techniques. Alternatively, nanowires can be chemically synthesized and can be deposited as layers of approximately parallel nanowires in one or more processing steps, including Langmuir-Blodgett processes with subsequent patterning. Other alternative techniques for fabricating nanowires may also be employed. Thus, a two-layer nanowire crossbar comprising first and second layers of nanowires, as shown in FIGS. 5-8, can be manufactured by any of numerous relatively straightforward processes. Many different types of conductive and semi-conductive nanowires can be chemically synthesized from metallic and semiconductor substances, from combinations of these types of substances, and from other types of substances. A nanowire crossbar may be connected to microscale address-wire leads or other electronic leads, through a variety of different methods in order to electronically couple the nanowires to electronic devices.

The resonant elements can be configured with dimensions that are smaller than the wavelength $\lambda$ of electromagnetic radiation incident on the crossbar 500 enabling the crossbar 500 to be operated as a NIM over particular wavelength ranges of interest. In particular, the size and shape of the fingers can be selected to have an appropriate inductance, resistance, and capacitance response to a wavelength of interest. In addition, because each resonant element can be separately addressed by biasing the pair of nanowires crossing at the selected resonant element, the refractive index of the intermediate layer of each resonant element can be adjusted by applying appropriate electronic signals, such as voltages or currents, to the nanowires. The size and shape of the fingers and control over the refractive index of the intermediate layer of the resonant elements enables the crossbar 500 to be configured and operated as a NIM over particular wavelength ranges of interest and shift the transmission phase of electromagnetic radiation transmitted through the crossbar 500.

Figure 9:
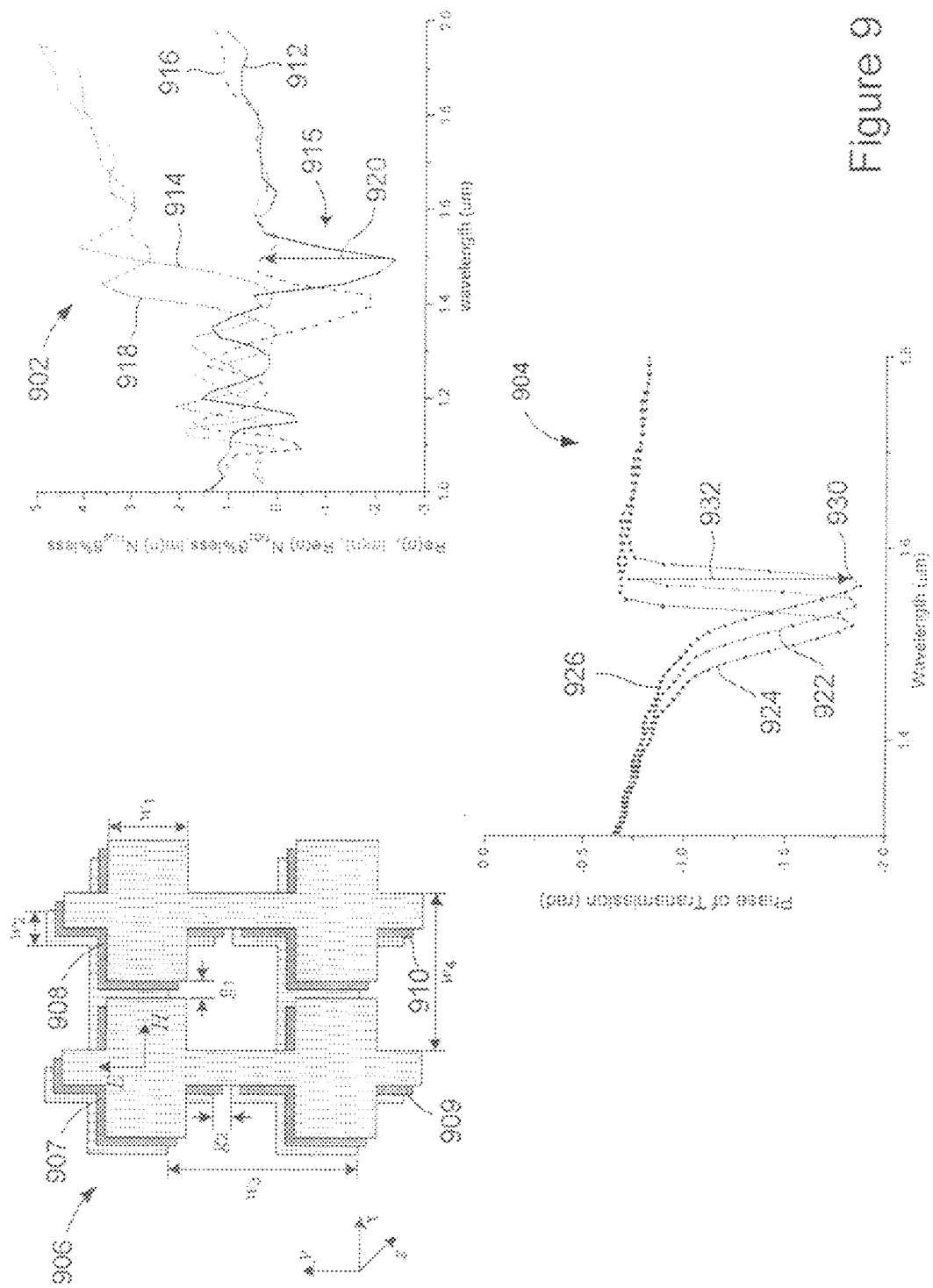
FIG. 9 shows a plot of the refractive index and phase changes for an exemplary negative index material crossbar configured and operated in accordance with embodiments of the present invention.

FIG. 9 shows a plot of the refractive index 902 and phase changes 904 for an exemplary NIM crossbar configured and operated in accordance with embodiments of the present invention. Plots 902 and 904 were obtained using the well-known finite-difference time-domain method ("FDTD") described in *Computational Electrodynamics: The Finite-Difference Time-Domain Method*, Third Edition, by Allen Taflove and Susan C. Hagness, Artech House Publishers (Jun. 30, 2005). FIG. 9 also includes a crossbar 906 representing four adjacent resonant elements with parameters identifying the dimensions of the nanowires, fingers, and spacing between resonant elements used to obtain the results displayed in plots 902 and 904. The dimensions of the parameters are provided in Table I as follows:

TABLE I

| Parameter | Dimension |
| --- | --- |
| $w_1$ | 225 nm |
| $w_2$ | 90 nm |
| $w_3$ | 450 nm |
| $w_4$ | 450 nm |
| $g_1$ | 45 nm |
| $g_2$ | 45 nm |

The nanowires are composed of Ag, and the plus-shaped intermediate layers 907-910 are composed of $TiO_2$ with a thickness of 60 nm.

For electromagnetic radiation polarized in the y-direction and incident on the crossbar 906 in the z-direction, curves 912 and 914 of plot 902 represent the real and imaginary refractive index components, respectively, over a range of wavelengths with no electronic signal applied to resonant elements of the crossbar 906. A portion 915 of the real component 912 indicates that the crossbar 906 exhibits a negative refractive index for incident electromagnetic radiation with wavelengths ranging from approximately 1.42 µm to approximately 1.55 µm with the largest negative refractive index occurring for incident electromagnetic radiation with wavelengths of approximately 1.5 µm. Curves 916 and 918 of plot 902 represent the real and imaginary refractive index components with a 6% change in the refractive index when appropriate electronic signals are applied to the nanowires of the crossbar 906. Curve 916 exhibits a real negative refractive index shift for incident electromagnetic radiation with wavelengths ranging from approximately 1.32 µm to approximately 1.46 µm with the largest negative refractive index occurring for incident electromagnetic radiation with wavelengths of approximately 1.4 µm. In other words, the crossbar 906 can be operated to change the refractive index that incident electromagnetic radiation encounters over particular wavelength ranges. For example, incident electromagnetic radiation with a wavelength of interest, such as a wavelength of approximately 1.5 µm, encounters the strongest real negative refractive index component when no electronic signal is applied to the crossbar 906. However, when appropriate electronic signals are applied to the nanowires, the refractive index encountered by the wavelength of interest is shifted to a positive relatively smaller in magnitude refractive index, as indicated by directional arrow 920.

A change in the refractive index encountered by the wavelength of interest shifts the transmission phase of the wavelength of interest. Curves 922-924 of plot 904 represent the transmission phase of electromagnetic radiation over a range of wavelengths passing through the crossbar 906 for three different refractive indices. Curve 922 represents the transmission phase acquired by electromagnetic radiation over a range of wavelengths passing through the crossbar 906 when no electronic signal is applied to the crossbar 906. Curve 924 represents the transmission phase acquired by electromagnetic radiation over a range of wavelengths passing through the crossbar 906 when electronic signals applied to the nanowires of the crossbar 906 increase the refractive index of the intermediate layers 907-910 by 3%. Curve 926 represents the transmission phase acquired by electromagnetic radiation over a range of wavelengths passing through the crossbar 906 when electronic signals applied to the nanowires of the crossbar 906 decrease the refractive index of the intermediate layers 907-910 by 3%. The crossbar 906 can be operated to shift the phase acquired by a wavelength of interest. The transmission phase is the phase acquired by electromagnetic radiation transmitted through the crossbar 906. For example, when no electronic signal is applied to the crossbar 906, point 928 indicates that electromagnetic radiation with the wavelength interest, approximately 1.58 µm, transmitted through the crossbar 906 acquires a transmission phase of approximately −0.7 radians. On the other hand, when electronic signals corresponding to the curve 926 are applied to the crossbar 906, the wavelength of interest acquires a transmission phase of approximately −1.78 radians, which is a transmission phase shift of approximately −1.2 radians from the point 928 to the point 930, as indicated by directional arrow 932.

Resonant Elements

The refractive index of the materials selected for the intermediate layer of the resonant elements can vary according to the particular molecular configuration or electronic states of the material. The materials selected for the resonant elements exhibit an appreciable refractive index change in response to externally applied electric fields, which can be used to control the resonant behavior of the phase shift, as described above with reference to FIG. 9. In certain embodiments, the material may transition reversibly from one state to another and back, so that the resonant elements may be reconfigured, or programmed, by application of differential current levels or voltages, called electronic signals, to selected resonant elements. The molecules comprising the intermediate layers of the resonant elements may have various different states in which the molecules exhibit resistive, semiconductor-like, or conductive electrical properties. The states and relative energies of the states of the intermediate layer materials may be controlled by applying differential current levels or voltages to the overlapping nanowires forming the resonant element. For example, in certain embodiments, certain states of the intermediate layer materials can be set by applying electronic signals to nanowires of a resonant element. In certain embodiments, the applied electronic signals can change the oxidation or redox state of the intermediate layer material which induces a change in the refractive index of the resonant element. Additional circuit elements such as diodes, transistors, memristors, capacitors, and resistors for optimal performance can be formed at resonant elements or a part of the nanowire crossbar. A nanowire crossbar can also be integrated with CMOS circuits.

Figure 10:
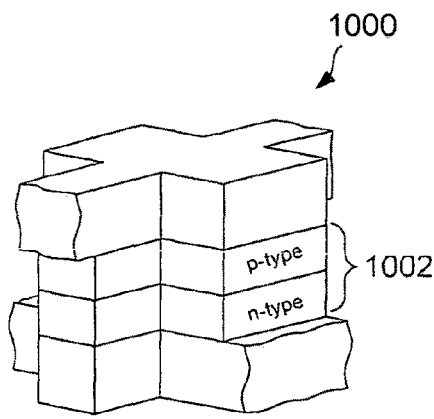
FIG. 10 shows an isometric view a resonant element configured with a p-n junction intermediate layer in accordance with embodiments of the present invention.

In certain embodiments, the refractive index of the resonant elements can be configured and operated as p-n junctions in order to change the refractive index of the resonant elements by carrier injection. FIG. 10 shows an isometric view a resonant element 1000 configured with a p-n junction intermediate layer 1002 in accordance with embodiments of the present invention. The p-n junction 1002 can be composed of a wide variety of semiconductor materials including various combinations of elemental and compound semiconductors. Indirect elemental semiconductors include silicon (Si) and germanium (Ge), and compound semiconductors include III-V materials, where Roman numerals III and V represent elements in the IIIa and Va columns of the Periodic Table of the Elements. Compound semiconductors can be composed of column IIIa elements, such as aluminum (Al), gallium (Ga), and indium (In), in combination with column Va elements, such as nitrogen (N), phosphorus (P), arsenic (As), and antimony (Sb). Compound semiconductors can also be further classified according to the relative quantities of III and V elements. For example, binary semiconductor compounds include semiconductors with empirical formulas GaAs, InP, InAs, and GaP; ternary compound semiconductors include semiconductors with empirical formula $GaAs_yP_{1-y}$, where y ranges from greater than 0 to less than 1; and quaternary compound semiconductors include semiconductors with empirical formula $In_xGa_{1-x}As_yP_{1-y}$, where both x and y independently range from greater than 0 to less than 1. Other types of suitable compound semiconductors include II-VI materials, where II and VI represent elements in the IIb and VIa columns of the periodic table. For example, CdSe, ZnSe, ZnS, and ZnO are empirical formulas of exemplary binary II-VI compound semiconductors.

As shown in FIG. 10, p-n junction 1002 includes a p-type layer and an n-type layer, where the p-type layer is doped with electron accepting impurities and the n-type layer is doped with electron donating impurities. The impurities also called dopants can be atoms. The dopants can be p-type impurities, which are atoms that introduce vacant electronic energy levels called "holes" to the electronic band gaps of the p-n junction 1002. These impurities are also called "electron acceptors." The dopants can be n-type impurities, which are atoms that introduce filled electronic energy levels to the electronic band gap of the p-n junction 1002. These impurities are called "electron donors." For example, boron (B), Al, and Ga are p-type impurities that introduce vacant electronic energy levels near the valence band of Si; and P, As, and Sb are n-type impurities that introduce filled electronic energy levels near the conduction band of Si. In III-V compound semiconductors, column VI impurities substitute for column V sites in the III-V lattice and serve as n-type impurities, and column II impurities substitute for column III atoms in the III-V lattice to form p-type impurities. Moderate doping of the p-type and n-type layers can have impurity concentrations in excess of about $10^{15}$ impurities/cm$^3$ while heavier doping can have impurity concentrations in excess of about $10^{19}$ impurities/cm$^3$.

The refractive index of the p-n junction 1002 can be adjusted by varying the magnitude and type of bias applied to p-n junction 1002. For example, a forward bias injects electrons into the n-type layer and vacant electronic states called "holes" are injected into the p-type layer. Under a reverse bias, electrons are injected into the p-type layer and holes are injecting into the n-type layer. However, once the bias is removed, the electrons and holes are swept out of the layers and the p-n junction 1002 returns to an unbiased electronic state. The refractive index of the p-n junction 1002 is different under the forward, reverse, and no bias.

Figure 11:
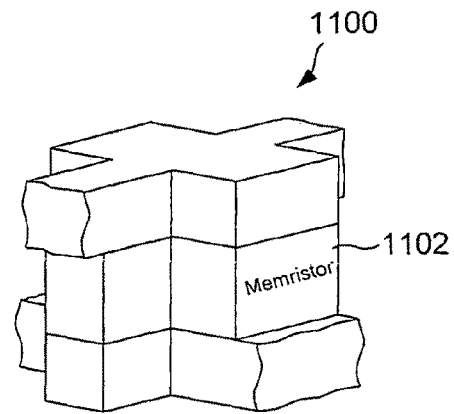
FIG. 11 shows an isometric view a resonant element configured with an intermediate memristors layer in accordance with embodiments of the present invention.

In other embodiments, the resonant elements can be configured as memristors that can change and retain their resistance state even after the bias has been removed. Each resistance state corresponds to a different refractive index. FIG. 11 shows an isometric view a resonant element 1100 configured with an intermediate memristors layer 1102 in accordance with embodiments of the present invention. The memristor layer 1102 includes a primary active region, or layer, and a secondary active region, or layer. The primary active region comprises a thin film of a material that is electronically semiconducting or nominally electronically insulating and can also be a weakly ionic conductor. The primary active material is capable of transporting and hosting ions that act as dopants to control the flow of electrons through the resonator element 1100. The basic mode of operation is to apply a voltage bias of an appropriate magnitude and polarity across the memristor layers at the junctions. The electrical field, also called a "drift field," enables the motion of the dopants in the primary material to drift into or out of the primary material via ionic transport. The ionic species are specifically chosen from those that act as electrical dopants for the primary material, and thereby change the rectifying state of the primary active material. The memristor layer 1102 can be placed in one of the four different types of rectifying states: a forward rectifier, a reverse rectifier, a head-to-head rectifier, and a shunted rectifier, as shown in FIG. 11. Each of the rectifying states corresponds to a different refractive index.

In addition, the primary active material and the dopants are chosen such that the drift of the dopants into or out of the primary active material is possible but not too facile in order to ensure that the memristor layer 1102 remains in a particular rectifying state for a reasonable period of time, perhaps for many years at room temperature. This ensures that the memristor layer 1102 is nonvolatile. In other words, the memristor layer 1102 holds its rectifying state (i.e., keeps memory of its resistive state) after the drift field has been removed. Applying a drift field with a large enough magnitude causes both electron current and dopant to drift, whereas applying biases with lower relative voltage magnitudes than the drift field causes negligible dopant drift enabling the element to hold its rectifying state.

On the other hand, the secondary active region comprises a thin film that is a source of dopants for the primary active material. These dopants may be impurity atoms such as hydrogen or some other cation, such as alkali or transition metals, that act as electron donors for the primary active material. Alternatively, the dopants can be anion vacancies, which in the primary active material are charged and therefore are also electron donors for the lattice. It is also possible to drive the anions into the primary active material, which become electron acceptors or hole donors.

The primary active material can be nanocrystalline, nanoporous, or amorphous. The mobility of the dopants in such nanostructured materials is much higher than in bulk crystalline material, since diffusion can occur through grain boundaries, pores or through local structural imperfections in an amorphous material. Also, because the primary active material film is thin, the amount of time needed for dopants to diffuse into or out of region of the film to substantially change the film's conductivity is relatively rapid. For example, the time needed for a diffusive process varies as the square of the distance covered, so the time to diffuse one nanometer is one-millionth the time to diffuse one micrometer.

The primary active and secondary active regions of the memristor layer 1102 are contacted on either side by nanowires or one of the nanowires can be composed of a semiconductor material and the other a metal. When the memristor layer 1102 is composed of semiconductor material, the contract between a metal electrode and the memristor layer 1102 depletes the memristor layer 1102 of free charge carriers. Thus, the memristor layer 1102 has a net charge that depends on the identity of the dopant which is positive in the case of electron donors and negative in the case of electron acceptors.

Figure 12:
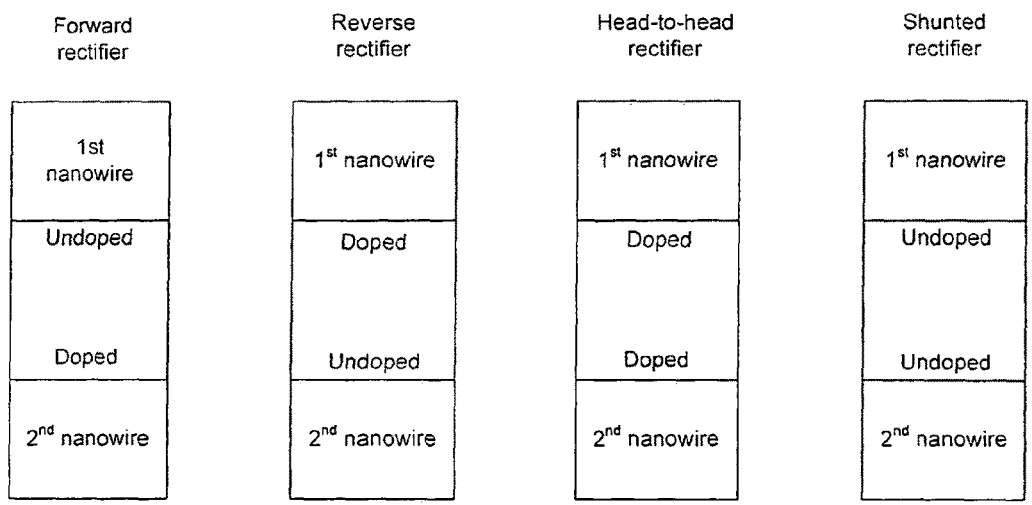
FIG. 12 shows four cross-sectional views of dopant distributions in memristor elements in accordance with embodiments of the present invention.

Switching from one rectifying state to another can be accomplished by applying an electric field of an appropriate magnitude and polarity across the memristor layer 1102. The electric field forces the dopants to drift into or out of the electrode/active region interface regions thus changing the rectifying state of the memristor layer 1102. For example, as shown in FIG. 12, an appropriate electric field can be used to force dopants located near the interfaces of the shunted rectifier to move to one of the interfaces thus changing the shunted rectifier into either the forward rectifier or the reverse rectifier.

The ability of the charged species to diffuse into and out of the primary active material is substantially improved if one of the interfaces connecting the memristor layer 1102 to a metal or semiconductor electrode is non-covalently bonded. Such an interface may be caused by a void in the material or it may be the result of an interface that contains a material that does not form covalent bonds with the electrode, the primary active material, or both. This non-covalently bonded interface lowers the activation energy of the atomic rearrangements that are needed for drift of the dopants in the primary active material. This interface is essentially an extremely thin insulator, and adds very little to the total series resistance of the element.

The primary and secondary active materials of the memristor layer 1102 can be oxides, sulfides, selenides, nitrides, phosphides, arsenides, chlorides, hydrides, and bromides of the transition and rare earth metals, with or without the alkaline earth metals being present. In addition, there are various alloys of these compounds with each other, which can have a wide range of compositions if they are mutually soluble in each other. In addition, the memristor layer 1102 can be composed of mixed compounds, in which there are two or more metal atoms combined with some number of electronegative elements. The dopants can be anion vacancies or different valence elements doped in the memristor layer 1102. One combination of materials is a primary active material that is undoped and stoichiometric, and thus a good insulator, combined with a secondary source/sink of the same or related parent material that either contains a large concentration of anion vacancies or other dopants that can drift into the primary material under the application of an appropriate bias.

The memristor layer 1102 can be composed of oxides that contain at least one oxygen atom (O) and at least one other element. In particular, the memristor layer 1102 can be composed of silica ($SiO_2$), titania ($TiO_2$), nickel-oxide (NiO), zirconia ($ZrO_2$), and hafnia ($HfO_2$) with or without 3d impurities (e.g., Cr, Mn), or sp-impurities (e.g., Li, Be, Ca). These materials are compatible with silicon (Si) integrated circuit technology because they do not create doping in the Si. Other embodiments for the memristor layer 1102 include alloys of these oxides in pairs or with all three of the elements Ti, Zr, and Hf present. For example, the memristor layer 1102 can be composed of $Ti_xZr_yHf_zO_2$, where $x+y+z=1$. Related compounds include titanates, zirconates, and hafnates. For example, titanates includes $ATiO_3$, where A represents one of the divalent elements strontium (Sr), barium (Ba) calcium (Ca), magnesium (Mg), zinc (Zn), and cadmium (Cd). In general, the memristor layer 1102 can be composed of $ABO_3$, where A represents a divalent element (e.g., $Sr^{++}$, $Ba^{++}$) and B represents $Ti^{4+}$, $Zr^{4+}$, and $Hf^{4+}$. The memristor layer 1102 can also be composed of alloys of these various compounds, such as $Ca_aSr_bBa_cTi_xZr_yHf_zO_3$ where a+b+c=1 and x+y+z=1. There are also a wide variety of other oxides of the transition and rare earth metals with different valences that may be used, both individually and as more complex compounds. In each case, the mobile dopant can be an oxygen vacancy or an aliovalent element doped into the memristor layer 1102. The oxygen vacancies effectively act as dopants with one shallow and one deep energy level. Because even a relatively minor nonstoichiometry of about 0.1% oxygen vacancies in $TiO_2$, is approximately equivalent to $10^{20}$ dopants/$cm^3$, modulating oxygen vacancy profiles have strong effect on electron transport.

In other embodiments, the memristor layer 1102 can be a sulfide or a selenide of the transition metals with some ionic bonding character, essentially the sulfide and selenide analogues of the oxides described above.

In other embodiments, the memristor layer 1102 can be a semiconducting nitride or a semiconducting halide. For example, semiconducting nitrides include AlN, GaN, ScN, YN, LaN, rare earth nitrides, and alloys of these compounds and more complex mixed metal nitrides, and semiconducting halides include CuCl, CuBr, and AgCl. The memristor layer 1102 can be a phosphide or an arsenide of various transition and rare earth metals. In all of these compounds, the mobile dopant can be an anion vacancy or an aliovalent element.

A variety of dopants can be used and are selected from a group consisting of hydrogen, alkali, and alkaline earth cations, transition metal cations, rare earth cations, oxygen anions or vacancies, nitrogen anions or vacancies, pnictide anions or vacancies, or halide anions or vacancies. Other suitable materials include metal hydrides, such as $Mg_2NiH_4$, $Mg_2MnH_7$, $Mg_6Co_2H_{11}$, $Mg_2CoH_5$, $Mg_2CoH_5$, and $Mg_2FeH_6$, and copper oxides, such as $Cu_2O$ and CuO, exhibit large changes in refractive indices.

Embodiments of the Present Invention

A. Secure Communication Systems

Figure 13:
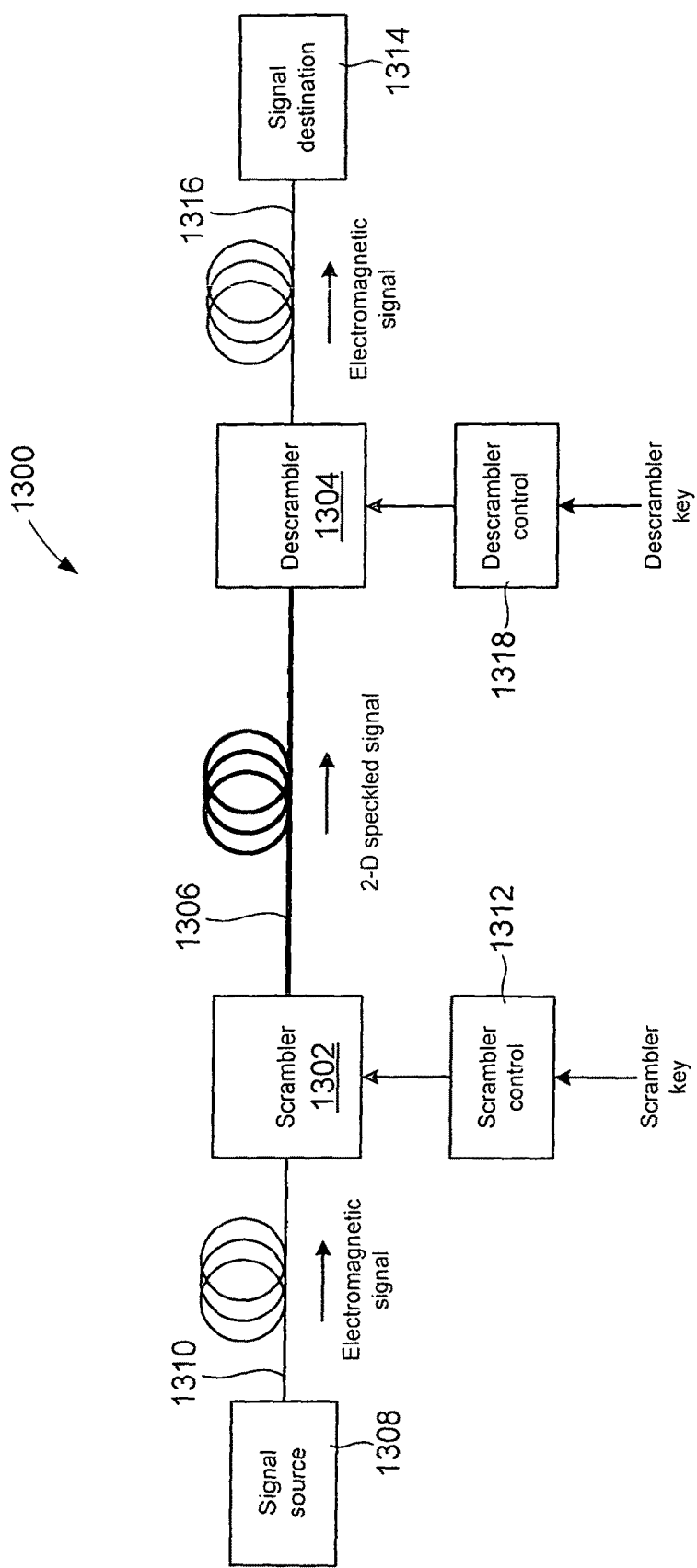
FIG. 13 shows a schematic representation of a first secure communication system configured in accordance with embodiments of the present invention.

FIG. 13 shows a schematic representation of a secure communication system 1300 configured in accordance with embodiments of the present invention. The system 1300 comprises a scrambler 1302 and a descrambler 1304 optically coupled via a multimode waveguide 1306. The scrambler 1302 is optically coupled to a signal source 1308 via a multimode waveguide 1310 and is electronically coupled to a scrambler control 1312. The descrambler 1304 is optically coupled to a signal destination 1314 via a multimode waveguide 1316 and is electronically coupled to a descrambler control 1318. The source 1308 includes one or more coherent electromagnetic radiation sources, and the destination 1314 includes one or more photodetectors. The multimode waveguides 1306, 1310, and 1316 can be multimode optical fibers, fiber ribbons, hollow waveguides, or any other suitable medium for transmitting electromagnetic signals. Hollow waveguides can be composed of a tube with an air core. The structural tube forming the hollow waveguide can have inner core materials with refractive indices greater than or less than one. The tubing can be composed of a suitable metal, glass, or plastic and metallic and dielectric films can be deposited on the inner surface of the tubing providing for a high reflectance. The hollow waveguides can be hollow metal waveguides with high reflective metal coatings lining the interior surface of the core. The air core can have a cross-sectional shape that is circular, elliptical, square, rectangular, or any other shape that is suitable for guiding light. Because the waveguide is hollow, optical signals can travel along the core of a hollow waveguide with an effective index of about 1. In other words, light propagates along the core of a hollow waveguide at the speed of light in air or vacuum. Electromagnetic signals encoding data are generated at the source 1308 by amplitude or phase modulating one or more modes of a coherent beam of electromagnetic radiation. The beam is transmitted along the waveguide 1310 and passes through the scrambler 1302.

Figure 14A:
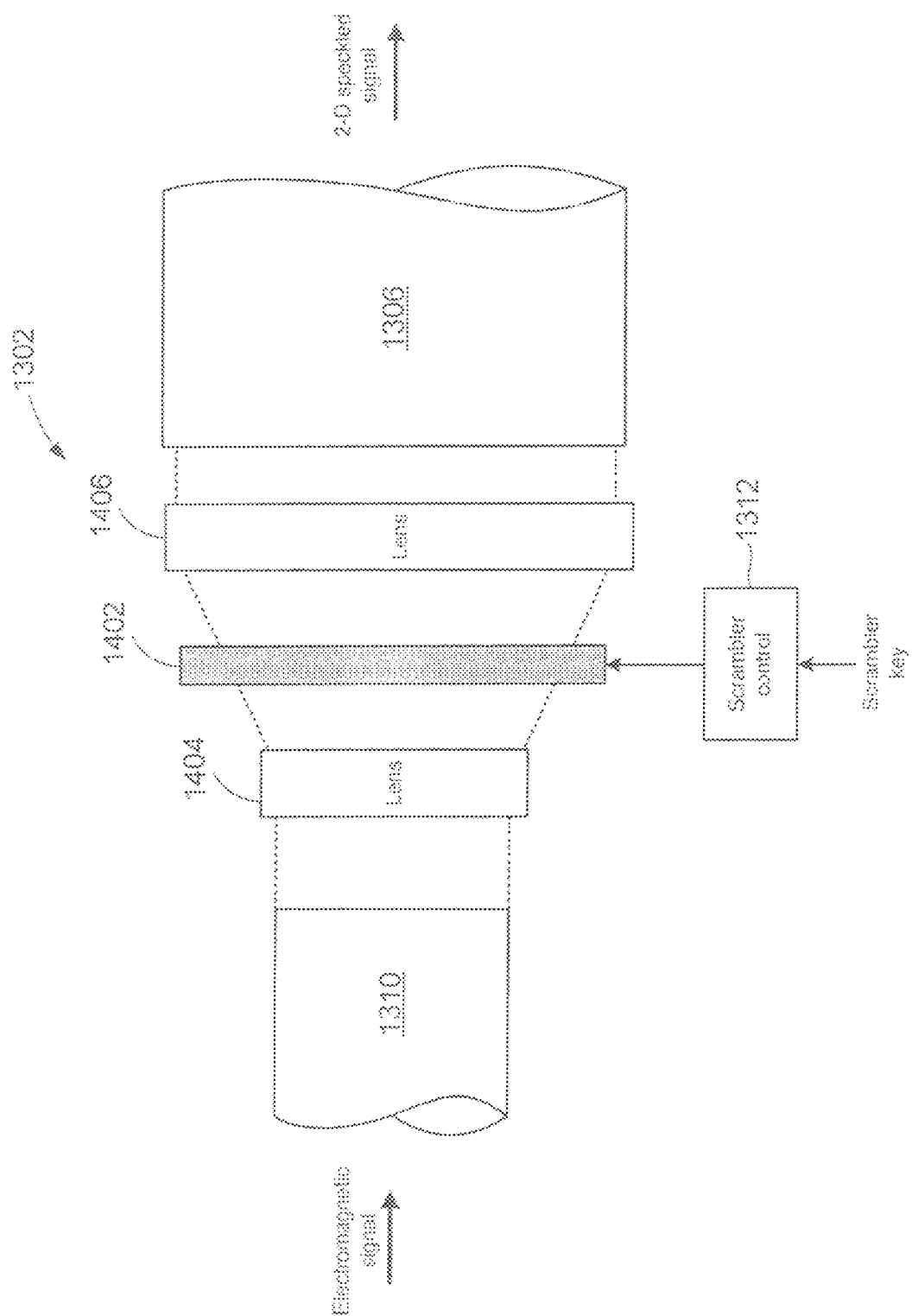
FIGS. 14A-14B show schematic representations of a scrambler configured and operated in accordance with embodiments of the present invention.

FIG. 14A shows a side view and schematic representation of the scrambler 1302 configured in accordance with embodiments of the present invention. The scrambler 1302 comprises an electronically controllable electro-optical material 1402 disposed between lenses 1404 and 1406. The electro-optical material 1402 is in electronic communication with the scrambler control 1312 which receives a scrambler key comprising a first set of electronic signals and applies the electronic signals to the electro-optical material 1402. The scrambler control 1312 can be a computing device and the scrambler key can be a set of instructions for generating the first set of electronic signals. Operation and configuration embodiments of the electro-optical material 1402 are described in greater detail below in subsection B. The first set of electronic signals produce a refractive index pattern within the electro-optical material 1404, as described below with reference to FIGS. 17-19

Figure 14B:
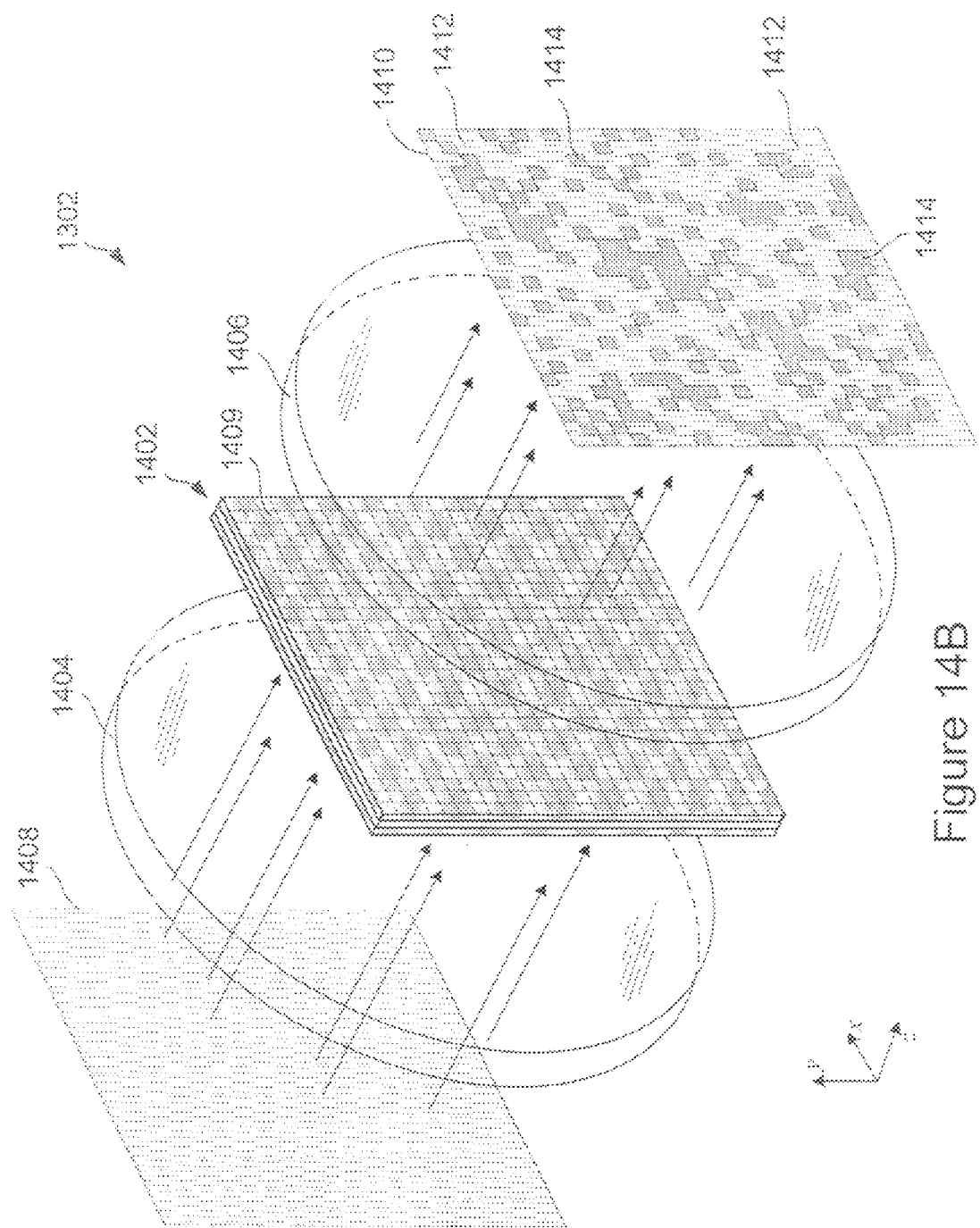

FIG. 14B shows an isometric view of the scrambler 1302 operated in accordance with embodiments of the present invention. The lens 1404 is configured to spread the incident beam of coherent electromagnetic radiation comprising electronic signals onto the electro-optical material 1402. Cross-sectional region 1408 represents the uniform intensity in the xy-plane of the beam as it passes through the lens 1404 and is incident on the electro-optical device 1402. The electro-optical material 1402 receives the first set of electronic signals that produce a refractive index pattern in phase-modulation elements of the electro-optical material 1402. For example, square 1409 represents a phase-modulation element having a particular effective refractive index determined by the first set of electronic signals. The refractive index pattern comprises phase-modulation elements that each having a particular effective refractive index. As portions of the beam pass through individual phase-modulation elements, each portion experiences a particular effective refractive index. As a result, the refractive index pattern produces a transmitted beam with relative phase differences in different portions of the transmitted beam. The relative phase differences result in non-uniform wavefronts and constructive and destructive interference within portions of the beam, as described below with reference to FIGS. 23-26. The interference produces variations in intensity in the xy-plane of the transmitted beam. These intensity variations form a speckle pattern that can be observed within an xy-plane cross-sectional view of the transmitted beam. Cross-sectional region 1410 of the transmitted beam reveals a two-dimensional speckled pattern comprising a random distribution of intensities. Note that only the high and low intensities are represented. In practice the intensities in a speckled pattern can have greater variation and finer granularity in the intensity distribution. For example, the speckled pattern displayed in the region 1410 includes a two-dimensional array of relatively high intensity regions represented by lightly shaded regions 1412 and relatively low intensity regions represented by darkly shaded regions 1414. The transmitted beam subsequently passes through the second lens 1406, which directs the beam into the waveguide 1306, as shown in FIG. 14A.

Figure 14C:
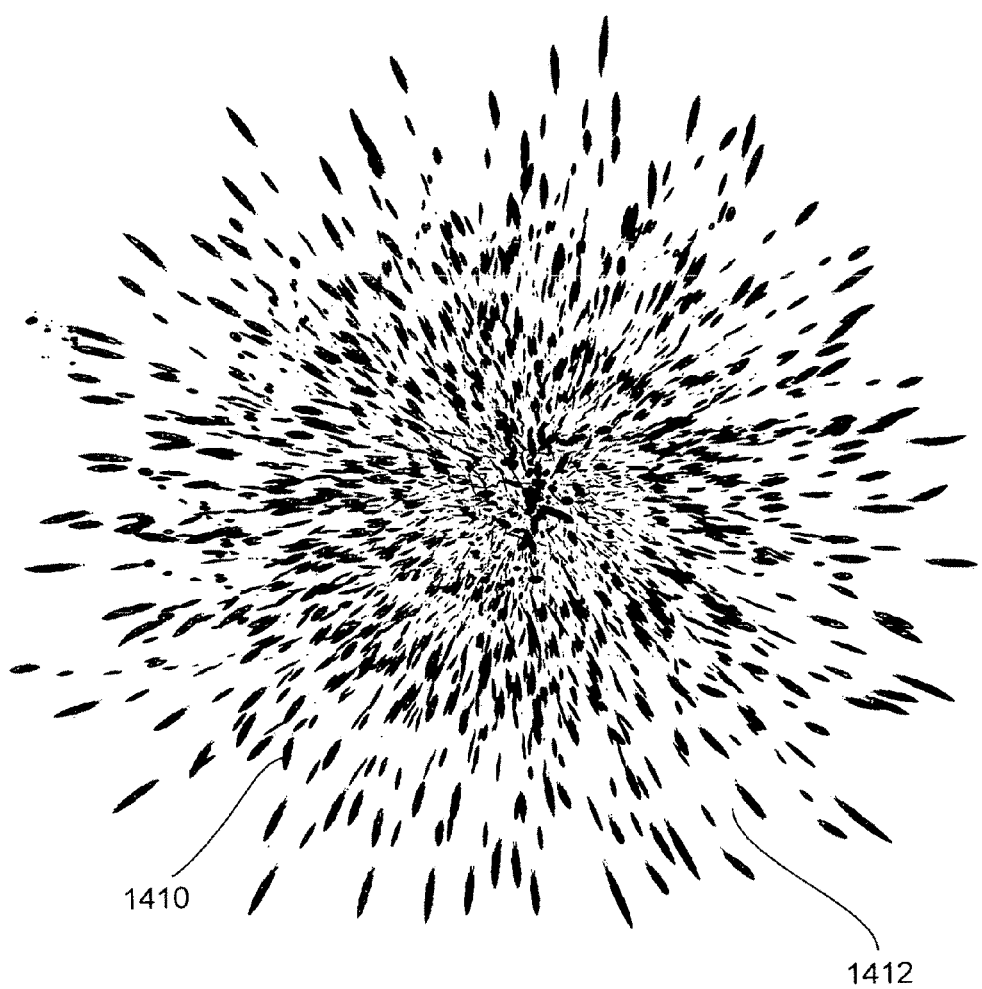
FIG. 14C shows an exemplary cross-sectional image of a speckle pattern within a beam of coherent electromagnetic radiation.

FIG. 14C shows an exemplary cross-sectional image of a speckle pattern within a beam of coherent electromagnetic radiation. The speckle pattern comprises a random distribution of varying intensities having a granular cross-sectional intensity appearance. For example, darkly shaded regions 1410 correspond to relatively lower intensity regions within the beam resulting from destructive interference of electromagnetic waves. Relatively lighter or unshaded regions 1412 correspond to relatively higher intensity regions within the beam resulting from constructive interference.

Returning to FIG. 13, the speckled beam output from the scrambler 1302 is transmitted along the waveguide 1306 to the descrambler 1304. Note that the waveguide 1306 can be configured with a relatively larger cross-sectional area than the waveguides 1310 and 1316 in order to accommodate the relatively larger cross-sectional area of the speckled beam of electromagnetic signals. When N modes sent to the scrambler 1302 with M<N, where M can be the number of channels in wavelength division multiplexed system, such as a dense-wave division multiplexed system or a coarse-wave division multiplexed system. Each channel carries amplitude and/or phase modulated information. The scrambler 1302 produces a speckle pattern with $N^M$ various speckles. In order to descramble the speckle pattern, embodiments of the present invention perform the reverse operation at the descrambler 1304 in order to obtain the M channels. The speckled pattern is essentially maintained along the entire length of the waveguide 1306. Because the speckled pattern varies over a relatively large cross-sectional area, the data encoded in the electromagnetic signals appears scrambled and unintelligible. In other words, it is impossible to interpret amplitude or phase modulations corresponding to data in the speckled beam with a photodetector located along the waveguide 1316.

Figure 15A:
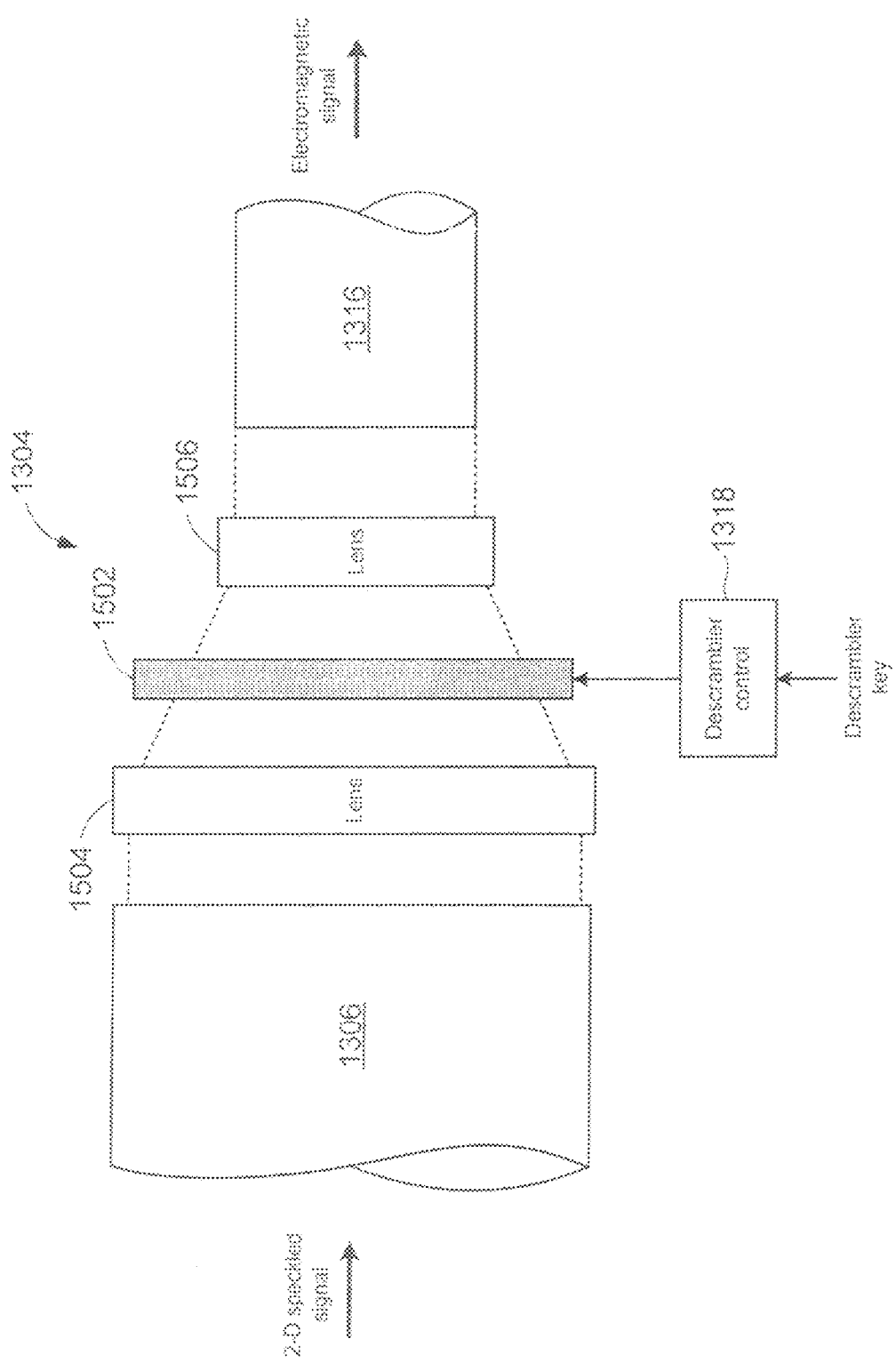
FIGS. 15A-15B show schematic representations of a descrambler configured and operated in accordance with embodiments of the present invention.

FIG. 15A shows a side view and schematic representation of the descrambler 1304 configured in accordance with embodiments of the present invention. The descrambler 1304 comprises a second electro-optical material 1502 disposed between lenses 1504 and 1506. The electronically controllable electro-optical material 1502 is in electronic communication with the descrambler control 1318, which receives a descrambler key comprising a second set of electronic signals that are applied to the electro-optical material 1502. The descrambler control 1318 can be a computing device that receives the descrambler key comprises instructions for generating the second set of electronic signals. Operation and configuration embodiments of the electro-optical material 1502 are described in greater detail below in subsection B. The second set of electronic signals also produce a refractive index pattern within the electro-optical material 1502 that removes the two-dimensional speckled pattern from the beam of electromagnetic signals, as described below with reference to FIGS. 17-19.

Figure 15B:
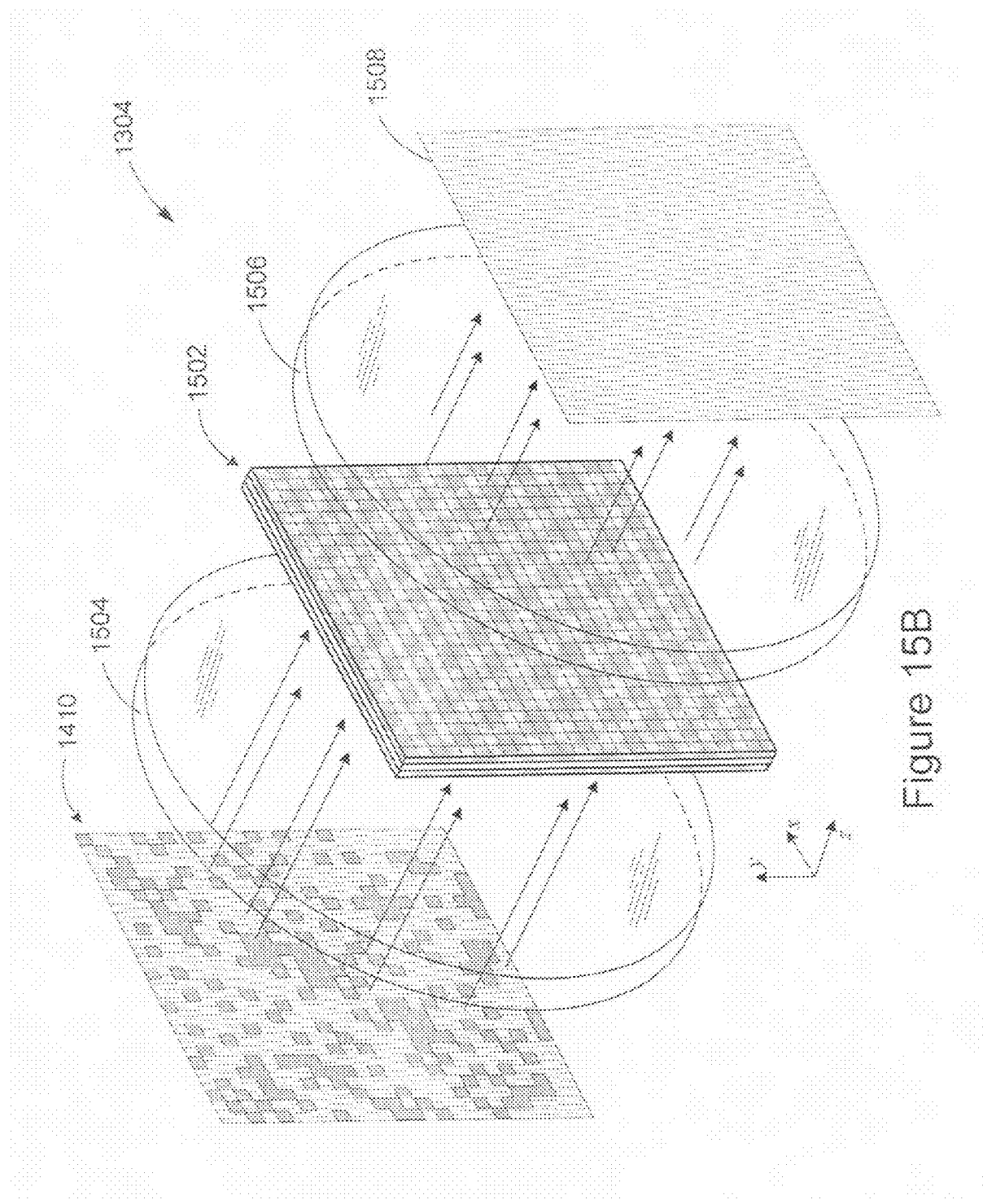

FIG. 15B shows an isometric view of the descrambler 1304 operated in accordance with embodiments of the present invention. The lens 1504 can be configured to narrow and direct the speckled beam into the electro-optical material 1502. The second set of electronic signals applied to the electro-optical material 1502 produce a refractive index pattern in the phase-modulation elements of the electro-optical material 1502 that removes the two-dimensional speckled pattern from the speckled beam, as described below with reference to FIG. 27. In other words, as the speckled beam passes through the electro-optical material 1504, the refractive index pattern of the phase-modulation elements effectively removes the two-dimensional speckled pattern from the beam shown in cross-sectional region 1410 restoring coherence and a uniform wavefront as represented in the cross-sectional region 1508 of the beam transmitted through the electro-optical material 1502. As a result, the electromagnetic signals are substantially restored and the data encoded in the electromagnetic signal is descramble and intelligible. As shown in FIG. 15A, the lens 1506 is configured to narrow and direct the beam of electromagnetic signals output from the electro-optical material 1504 into the waveguide 1316.

Returning again to FIG. 13, the beam output from the descrambler 1304 is transmitted along the waveguide 1316 to the signal destination 1314, where the electromagnetic signals may be converted into electronic signals that can be processed.

Figure 16:
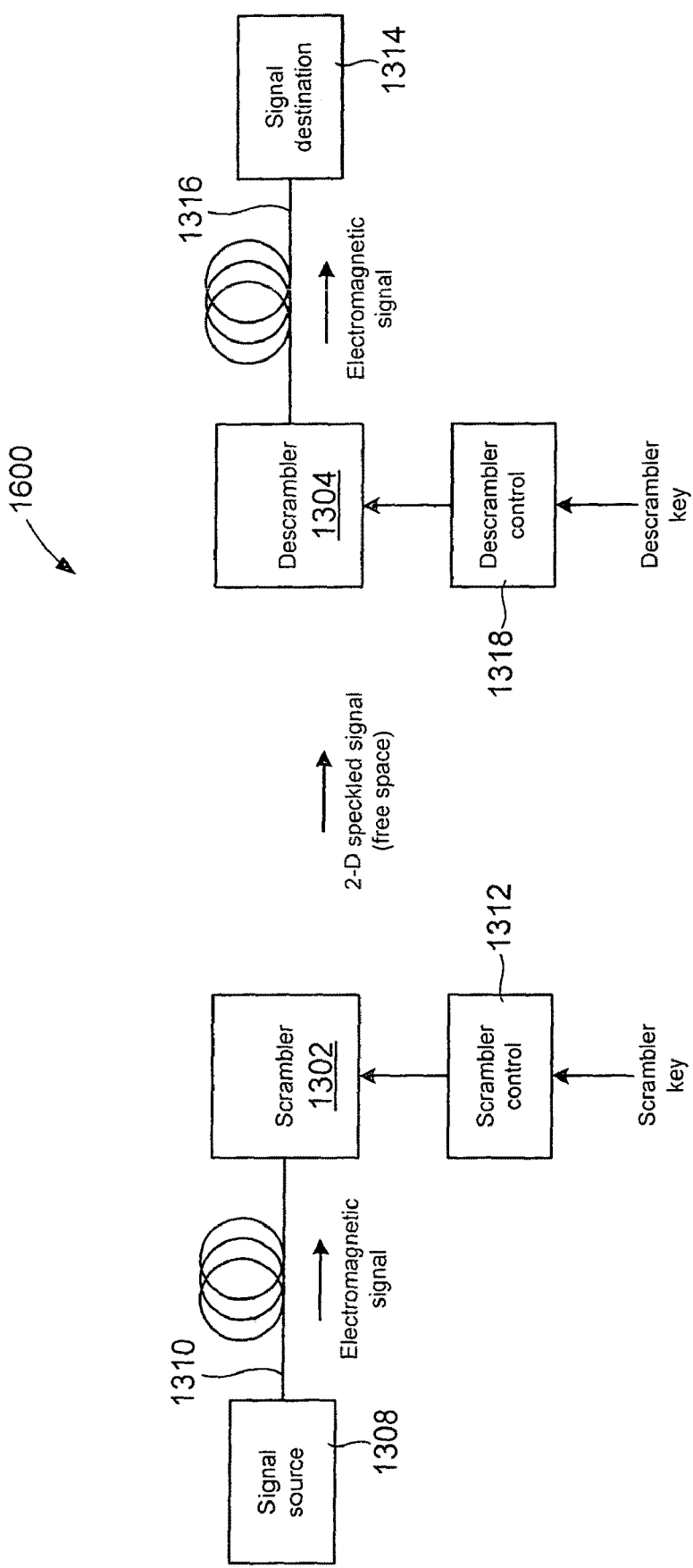
FIG. 16 shows a schematic representation of a second secure communication system configured in accordance with embodiments of the present invention.

In other embodiments, the speckled pattern of electromagnetic signals can be transmitted in free space between the scrambler 1302 and the descrambler 1304. FIG. 16 shows a schematic representation of a secure communication system 1600 configured in accordance with embodiments of the present invention. The system 1600 is nearly identical to the system 1300 except the multimode waveguide 1306 has been removed and the speckled beam is transmitted from the scrambler 1302 to the descrambler 1304 through free space.

The terms "source" and "destination" are used to describe the system embodiments above are relative terms depending on which side is transmitting. For example, at other times, the source 1308 becomes the destination and the destination 1312 becomes source for sending electromagnetic signals in the opposite direction, and the operations performed by scrambler and descrambler can be reversed.

B. Electro-Optical Materials

Figure 17:
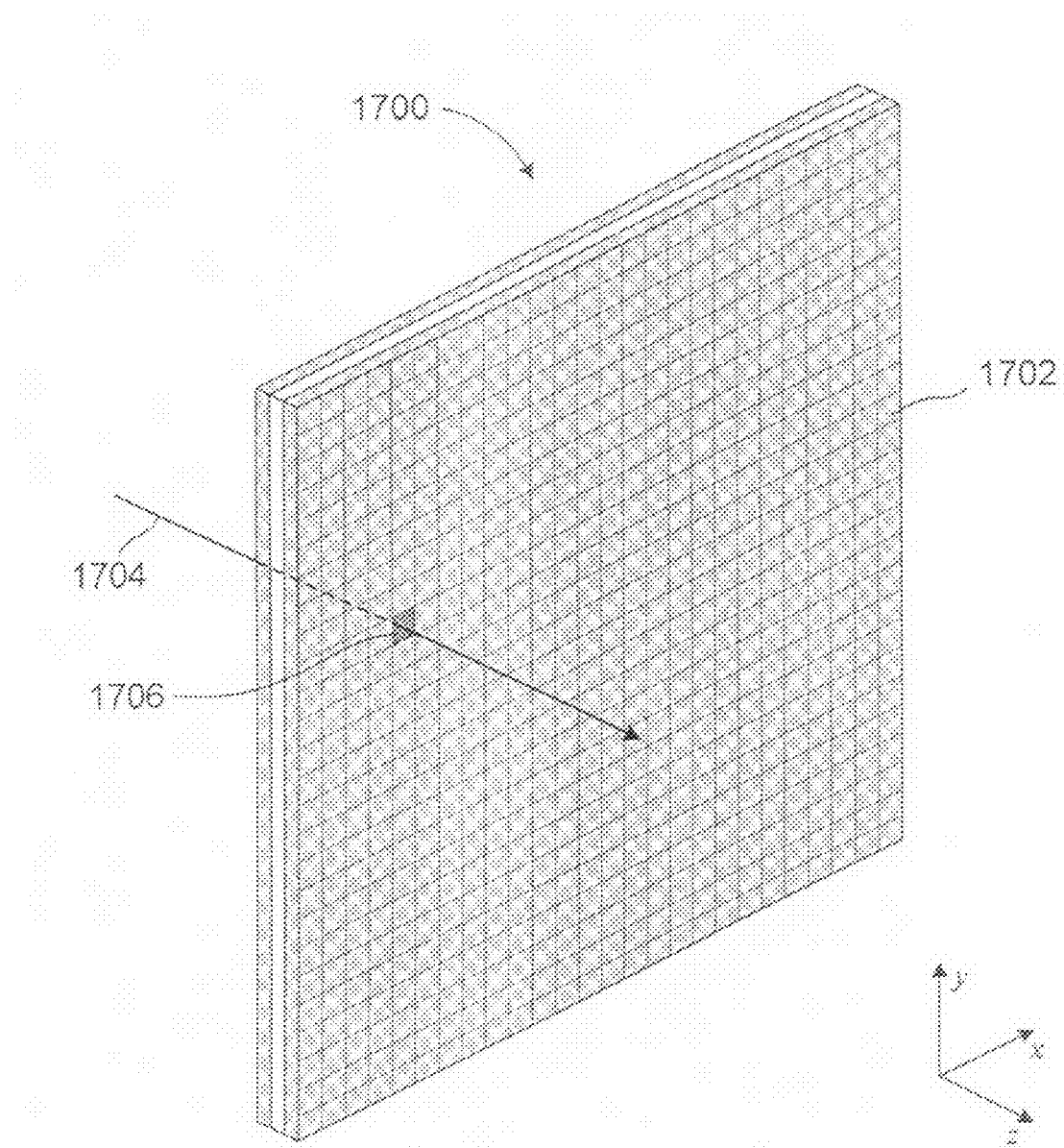
FIG. 17 shows an exploded isometric view of an electronically addressable and dynamically reconfigurable electro-optical material configured in accordance with embodiments of the present invention.

FIG. 17 shows an exploded isometric view of an electronically addressable and dynamically reconfigurable electro-optical material 1700 configured in accordance with embodiments of the present invention. As shown in the example of FIG. 17, the surface 1702 of the electro-optical material 1700 includes grid lines that outline a two-dimensional array of squares, each square representing a "phase-modulation element." The refractive index of each phase-modulation element can be independently and electronically controlled. In other words, the phase-modulation elements are "electronically addressable." For a ray of light passing through a phase-modulation element, a transmission phase can be applied to the ray, where the magnitude of the transmission phase is associated with the magnitude of the effective refractive index. For example, suppose directional arrow 1704 represents a ray of light originating from a light source (not shown). As the ray passes through the phase-modulation element 1706, a first voltage applied to the element 1706 induces a change in the effective refractive index of the element 1706. As a result, the ray 1704 acquires a transmission phase as it emerges from the element 1706, and it may also exhibit an intensity decrease due to insertion loss. A more detailed description of the operation of the material 1700 is given below.

Figure 18:
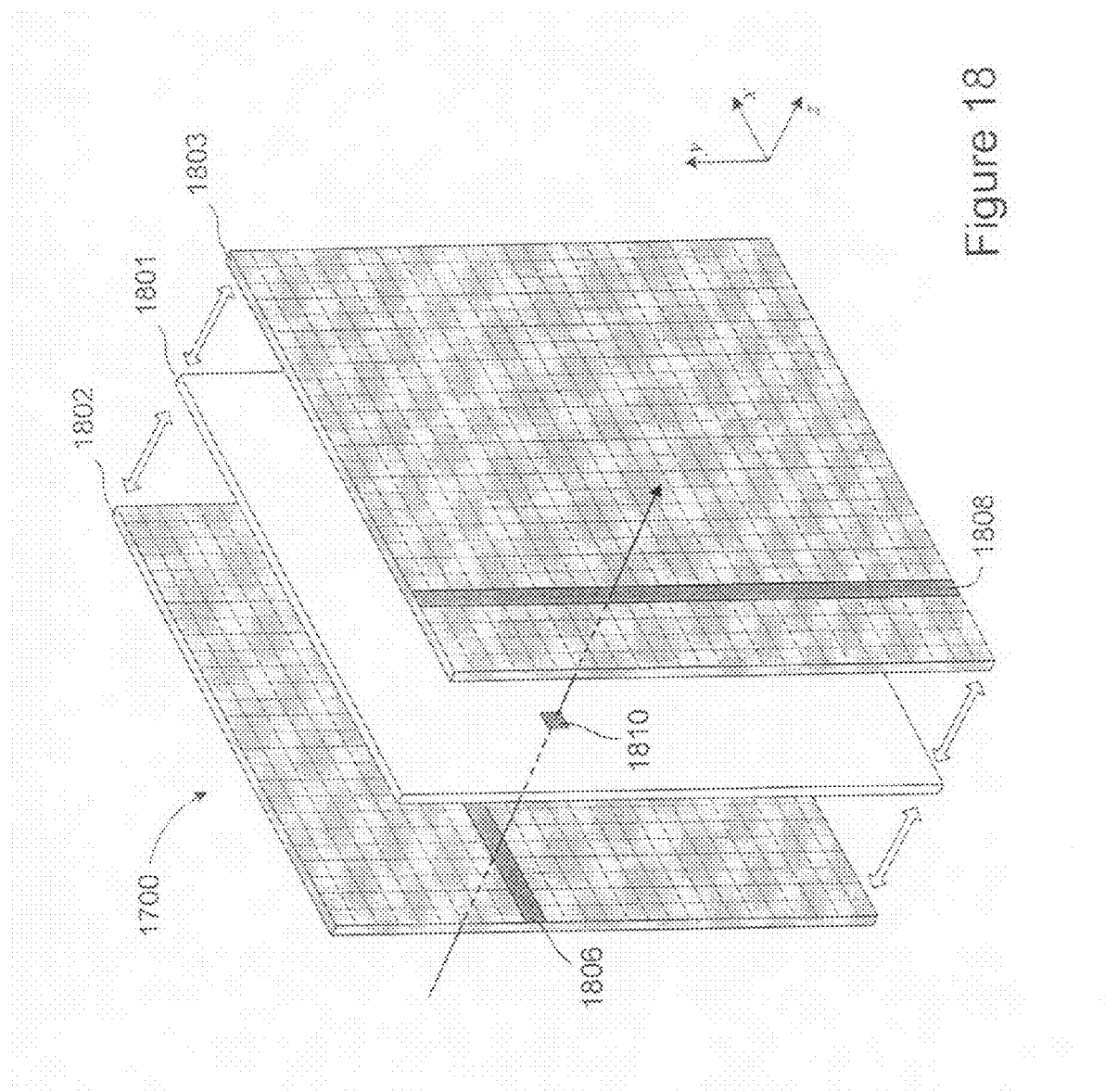
FIG. 18 shows an exploded isometric view of the electro-optical material, shown in FIG. 17, configured in accordance with embodiments of the present invention.

FIG. 18 shows an exploded isometric view of the electro-optical material 1700 configured in accordance with embodiments of the present invention. As shown in FIG. 18, the electro-optical material 1700 comprises an intermediate phase-modulation layer 1801 sandwiched between two outer conductive layers 1802 and 1803. Each phase-modulation element is electronically addressed as follows. The conductive layers 1802 and 1803 are configured so that voltages can be applied to substantially orthogonal overlapping strips or bands of the conductive layers 1802 and 1803. Each intersection of overlapping strips in layers 1802 and 1803 corresponds to a phase-modulation element. For example, as shown in FIG. 18, applying an appropriate voltage or current to a first strip 1806 of conductive layer 1802 running substantially parallel to the x-axis and simultaneously applying an appropriate voltage or current to a second strip 1808 of conductive layer 1803 running substantially parallel to the y-axis produces a voltage across, or current through, a region 1810 of layer 1801. As a result, the refractive index of the region 1810 is changed. The degree to which the refractive index is changed can vary depending on the magnitude of the voltage or current applied to the region 1810.

Figure 19:
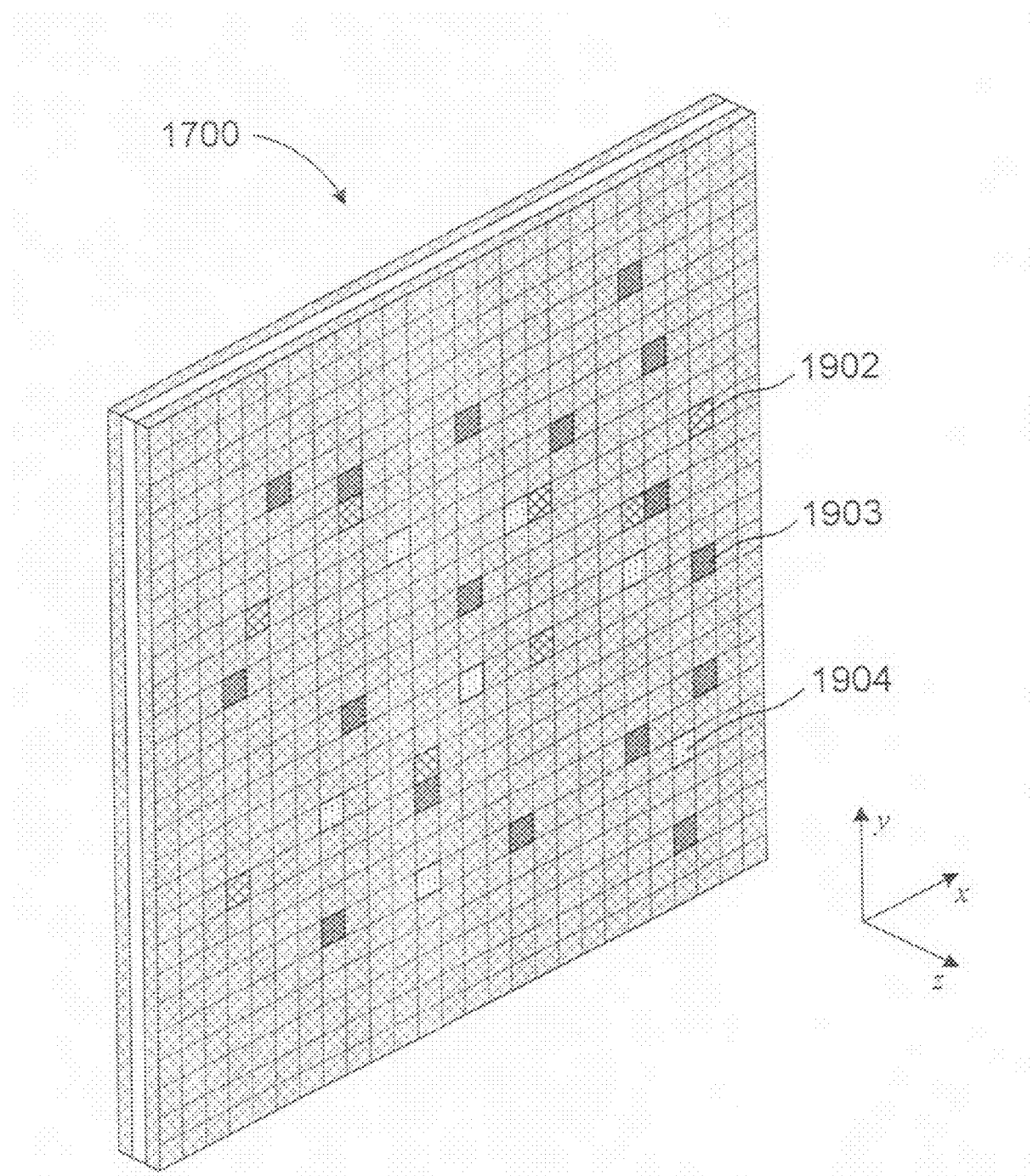
FIG. 19 shows highlighted phase-modulation elements of the electro-optical material, shown in FIG. 17, having different refractive indices in accordance with embodiments of the present invention.

The refractive index of each phase-modulation element can be varied by applying a different voltages or current to each phase-modulation element. FIG. 19 shows a number of highlighted phase-modulation elements having different refractive indices in accordance with embodiments of the present invention. Each element is electronically addressable as described above with reference to FIG. 18, and depending on the magnitude of the voltage or current applied to each element, the effective refractive index of each element can be separately adjusted. For example, shaded elements 1902-1904 each represent elements having different effective refractive indices which result from applying different voltages or currents to each of the elements 1902-1904. The change in the effective refractive index can range from a few percent to approximately 10%.

Figure 20:
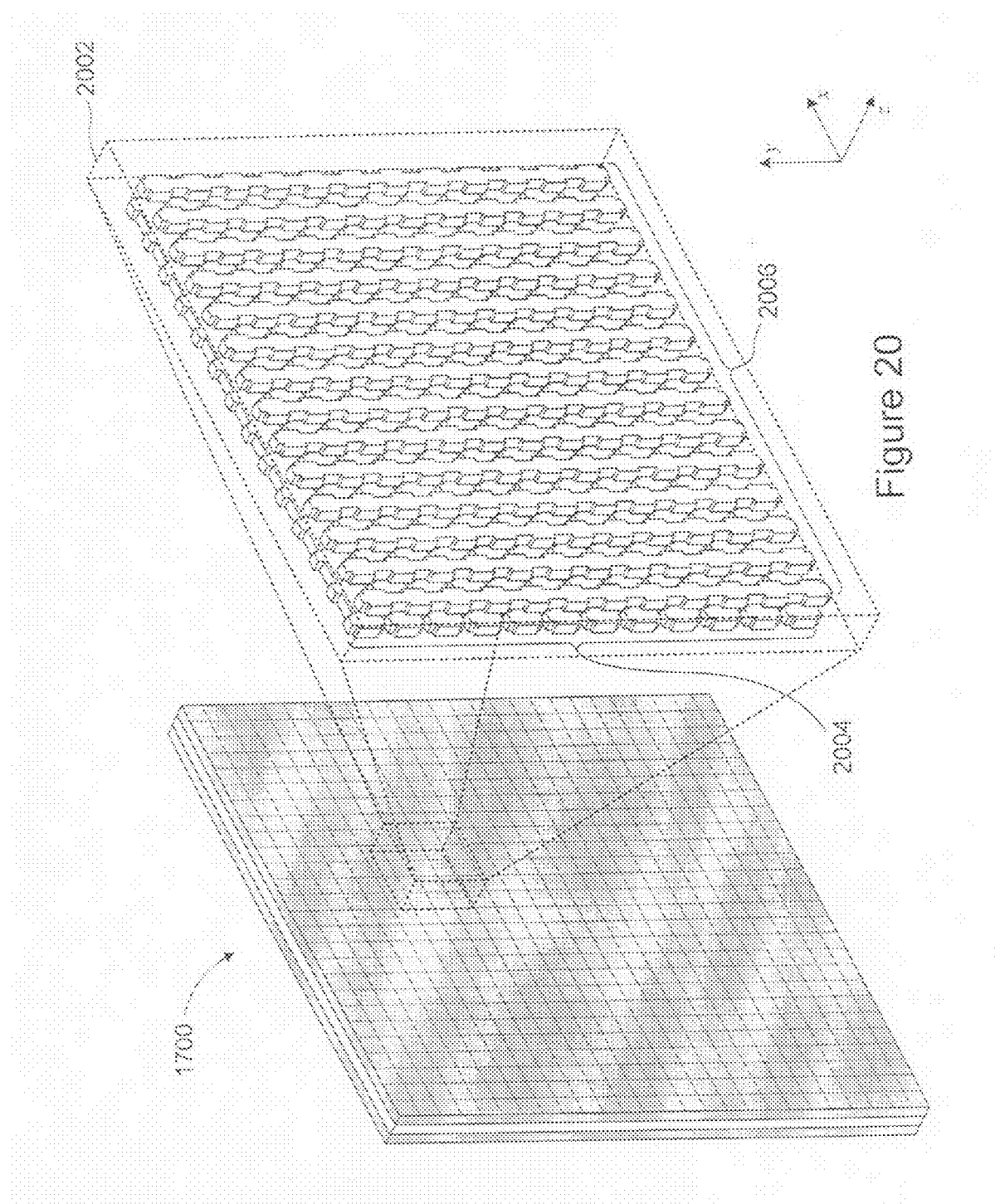
FIG. 20 shows an isometric view of exemplary configuration embodiments of the electro-optical material shown in FIG. 17.

In certain embodiments, the electro-optical material 1700 can be configured as a resonant plasmonic metamaterial that can be operated to exhibit negative refraction for particular wavelengths of electromagnetic radiation. Each electronically addressable phase-modulation element can be composed of one or more resonant elements. FIG. 20 shows an isometric view and an enlargement of a region 2002 of the electro-optical material 1700 configured in accordance with embodiments of the present invention. The enlarged region 2002 reveals that the electro-optical material 1700 is implemented as a crossbar NIM comprising an intermediate layer sandwiched between a first layer of non-crossing approximately parallel nanowires 2004 and a second layer of non-crossing approximately parallel nanowires 2006, where the nanowires in the first layer 2004 are approximately perpendicular to the nanowires in the second layer 2006. The crossbar NIM and resonant elements are configured and operated as described above with reference to the subsections Negative Index Material Crossbars and Resonant Elements.

Figure 21:
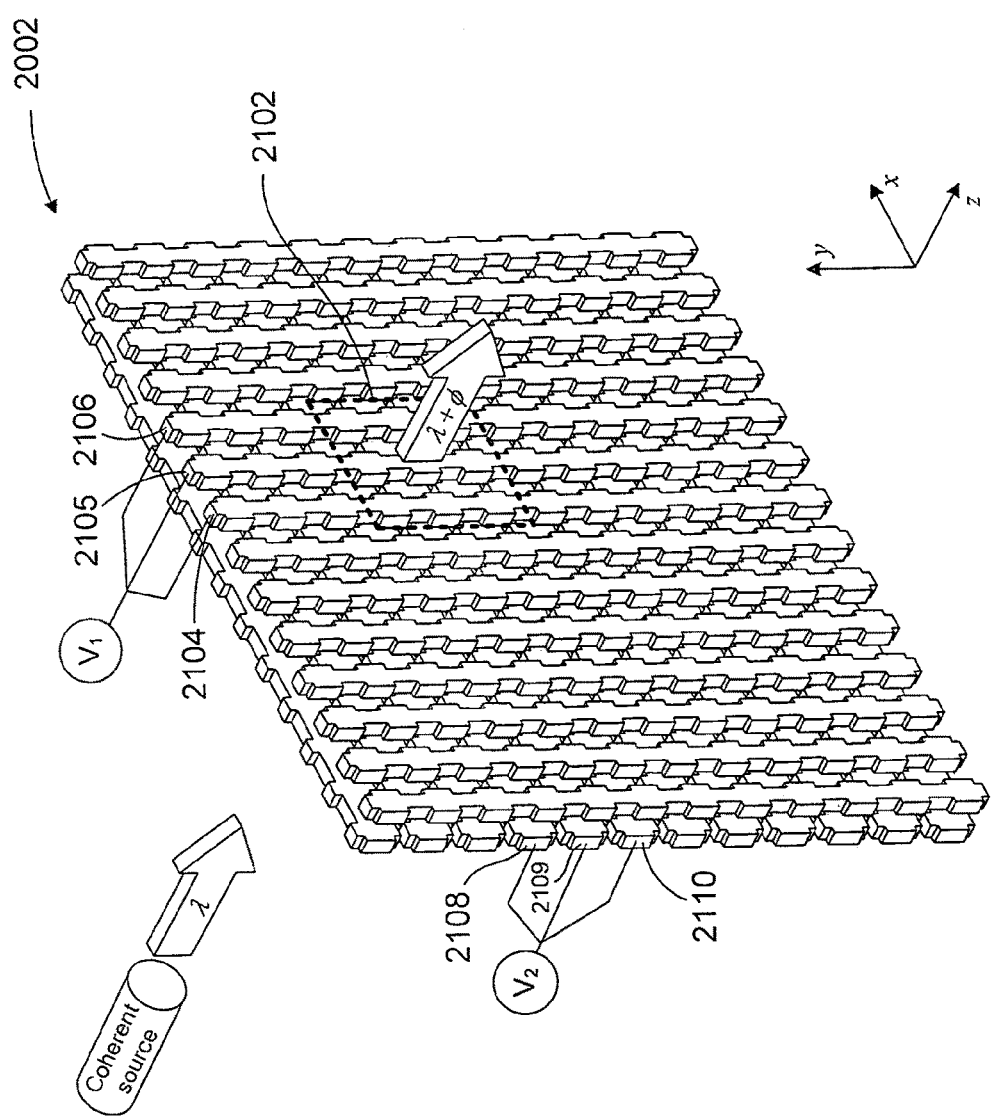
FIG. 21 shows an isometric view of the region, shown in FIG. 20, operated in accordance with embodiments of the present invention.

FIG. 21 shows an isometric view of the region 2002 of the electro-optical material 1700 operated in accordance with embodiments of the present invention. A phase-modulation element 2102 is identified in FIG. 21 by a dashed-line enclosure. The phase-modulation element is composed of a square array of 9 resonant elements. A change in the refractive index of a phase-modulation element is the result of changes in the refractive indices of the resonant elements comprising the element. As described above in the subsections Negative Index Material Crossbars and Resonant Elements, a refractive index change of a resonant element can be the result of changes in an oxidation or redox state, resistivity, variation in ion concentration, injection of charge carriers under a forward or reverse bias, or any other source of refractive index change. A change in the refractive index of a resonant element depends on the chemical composition of the volatile or non-volatile materials selected for the phase-modulation layer and on the magnitude and polarity of the electronic signals applied to the resonant element. As shown in FIG. 21, the element 2102 is electronically coupled to voltage sources so that the resonant elements of element 2102 can be individually and electronically addressed. In order to change the refractive index of the resonant element 2102, the nanowires 2104-2106 are electronically addressed by applying the same voltage $V_1$ to the nanowires 2104-2106 and a different voltage $V_2$ to all three of the nanowires 2108-2110 resulting in applying the same voltage across each of the nine resonant elements comprising the element 2102. As a result, the refractive indices of the individual resonant elements comprising the element 2102 are changed to the same effective refractive index, and light with wavelength λ transmitted through the element 2102 acquires a transmission phase shift 0 in accordance with the refractive index of the resonant elements comprising the element 2102. For example, the refractive index of the nine resonant elements comprising the element 2102 can be shifted as described above with reference to plot 902 of FIG. 9.

Figure 22:
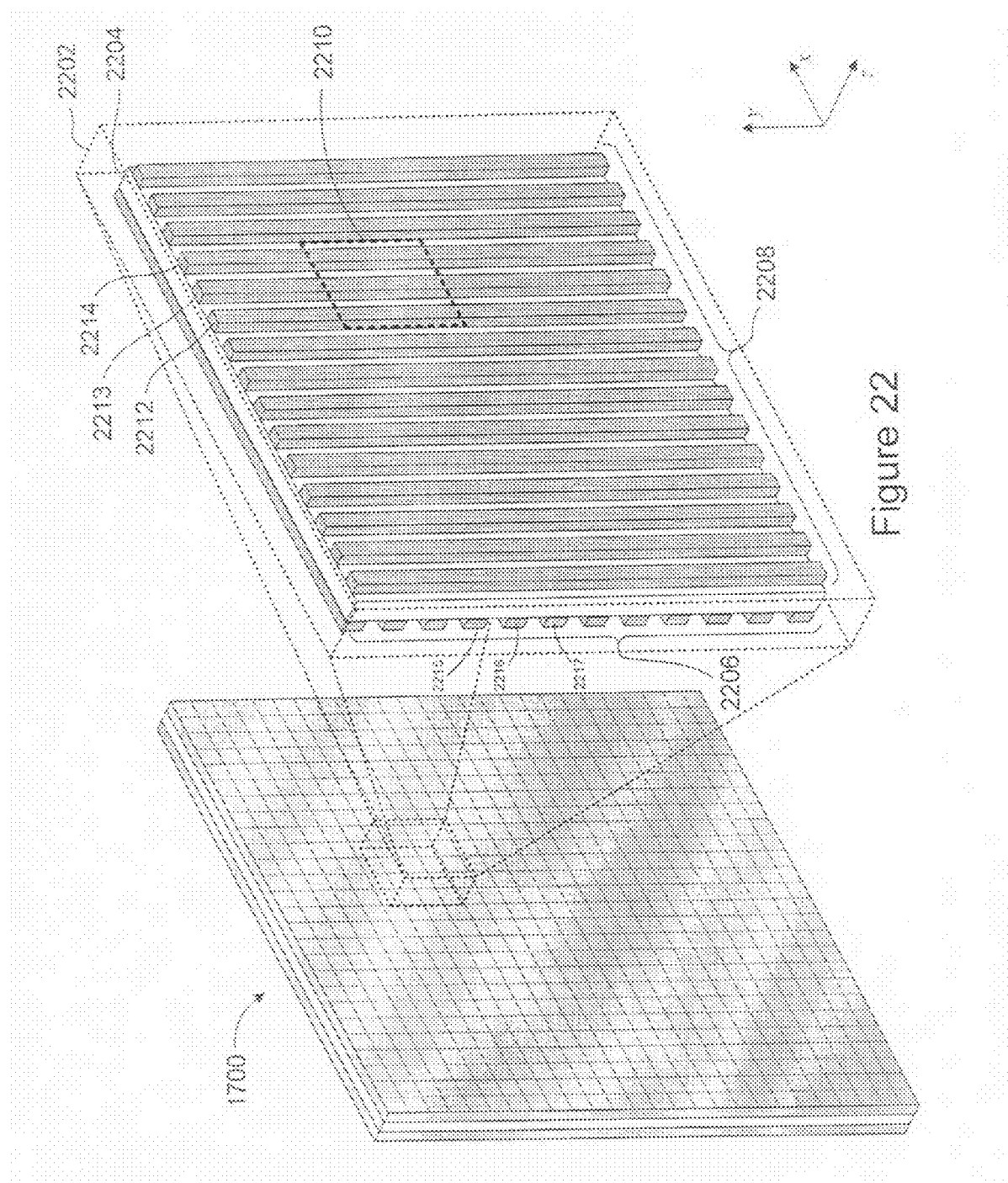
FIG. 22 shows an isometric view of other exemplary configuration embodiments of the electro-optical material shown in FIG. 17.

In other embodiments, the electro-optical material 1700 can be configured as a non-metamaterial nanowire crossbar that can be operated to exhibit positive effective refractive index changes. FIG. 22 shows an isometric view and an enlargement of a region 2202 of the electro-optical material 1700 configured as a non-metamaterial crossbar in accordance with embodiments of the present invention. The enlarged region 2202 reveals that the electro-optical material 1700 is implemented as a crossbar comprising an electro-optical layer 2204 sandwiched between a first layer of non-crossing approximately parallel nanowires 2206 and a second layer of non-crossing approximately parallel nanowires 2208, where the nanowires in the first layer 2206 are approximately perpendicular to the nanowires in the second layer 2208. The electro-optical layer 2204 can be composed of lithium niobate, a polymer, or any suitable volatile or non-volatile material described above in the Resonant Elements subsection that undergoes a refractive index change when an appropriate electronic signal is applied to the nanowire intersections. FIG. 22 also includes a phase-modulation element 2210 identified by a dashed-line enclosure and corresponding nanowires 2212-2214 overlaying nanowires 2215-2217. Appropriate electronic signals applied to nanowires 2212-2214 and nanowires 2215-2217 changes the effective refractive index of the portion of the electro-optical layer 2204 between the nanowires 2212-2214 and the nanowires 2215-2217. Depending on the volatile or non-volatile material selected for the electro-optical layer 2204 and the magnitude of the electronic signals applied to the nanowires 2212-2217, the effective refractive index of the phase-modulation element 2210 can increased or decreased accordingly. Electromagnetic radiation transmitted through the phase-modulation element 2210 acquires a transmission phase associated with the effective refractive index of the element 2210.

Figure 23:
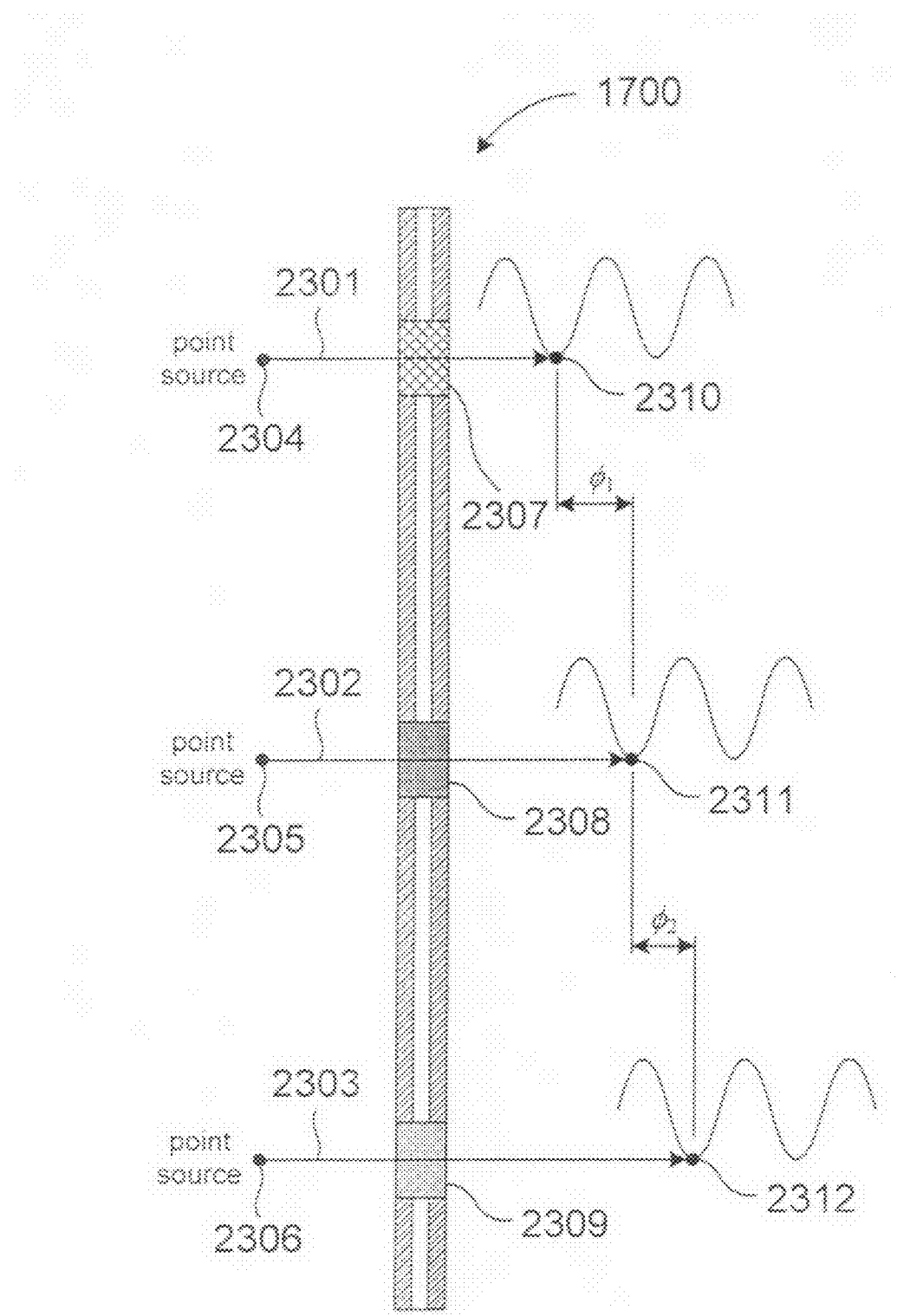
FIG. 23 shows a side view of rays of light transmitted through three phase-modulation elements of the electro-optical material, shown in FIG. 17, operated in accordance with embodiments of the present invention.

FIG. 23 shows a side view of rays of light transmitted through three phase-modulation elements of the electro-optical material 1700 operated in accordance with embodiments of the present invention. Rays of light 2301-2303 emanating from point sources 2304-2306 pass through phase-modulation elements 2307-2309, respectively. In the example shown in FIG. 23, each phase-modulation element is electronically addressed, as described above with reference to FIGS. 21 and 22, and has a different refractive index with phase-modulation element 2307 having the largest refractive index, phase-modulation element 2308 having the second largest refractive index, and phase-modulation element 2309 having the smallest refractive index. As rays 2301-2303 enter associated phase-modulation element 2307-2309, the light slows to a velocity v=c/n where v is the velocity of light propagating through a phase-modulation element, c is the speed of light in free space, and n is the magnitude of effective refractive index of the associated phase-modulation elements. Thus, ray 2304 passing through the phase-modulation element 2307 with the slowest velocity, ray 2305 passing through the phase-modulation element 2308 with the second slowest velocity, and ray 2306 has the highest relative velocity.

As shown in FIG. 23, points 2310-2312 represent points on electromagnetic waves that simultaneously enter the phase-modulation elements 2307-2309, respectively, but due to the different refractive indices at the phase-modulation elements, the points 2310-2312 of the electromagnetic waves emerge at different times from the phase-modulation element 2307-2309 and, therefore, are located at different distances from the electro-optical material 1700. In other words, the electromagnetic waves emerging from the phase-modulation element 2307-2309 acquire transmission phase shifts. As shown in FIG. 23, the relative phase difference between the electromagnetic waves emerging from phase-modulation element 2307 and 2308 is $\phi_1$, and the relative phase difference between electromagnetic waves emerging from phase-modulation element 2308 and 2309 is $\phi_2$, with the greatest relative phase difference of $\phi_1+\phi_2$ for electromagnetic waves emerging from phase-modulation element 2307 and 2309. The electronic signals applied to the phase-modulation elements 2307-2309 can be rapidly modulated, which, in turn, rapidly modulates the refractive indices of the phase-modulation elements 2307-2309 resulting in rapid changes in relative phase differences between rays emerging from the phase-modulation element 2307-2309.

FIG. 24 shows a side view of a beam of monochromatic electromagnetic radiation entering and emerging from the electro-optical material 1700 in accordance with embodiments of the present invention. Ideally monochromatic light is transmitted through the electro-optical material 1700. However, in practice it is recognized that light sources typically do not emit true monochromatic light but instead emits light in a narrow band of wavelengths called "quasimonochromatic light." The electromagnetic radiation enters the electro-optical material 1700 with uniform wavefronts 2402 having the wavelength $\lambda$. Each wavefront crest is identified by a solid line and each wavefront trough is identified by a dashed line. In other words, each wavefront enters the electro-optical material 1700 with substantially the same phase. The transmission phases produced by different addressed phase-modulation elements (not identified) produce non-uniform wavefronts 2404, which corresponds to the different transmission phases, as described above with reference to FIG. 23. The non-uniform wavefronts 2404 can result from certain portions of the incident uniform wavefronts 2402 passing through phase-modulation elements that have been electronically configured with relatively different refractive index magnitudes. For example, portions of non-uniform wavefronts in region 2406 emerge from the electro-optical material 1700 later than portions of non-uniform wavefronts in region 2408. In other words, the electro-optical material 1700 is configured to introduce relatively large transmission phase differences between portions of wavefronts emerging in region 2406 and portions of wavefronts emerging in region 2408.

The speckle pattern in a beam of coherent electromagnetic radiation transmitted through the electro-optical material 1700 is a result of constructive and destructive interference of many waves having different transmission phases giving resultant waves whose amplitude, and therefore intensity, varies randomly. FIG. 25 shows a slice through incident rays 2502 and output rays 2504 associated with a coherent beam of electromagnetic radiation transmitted through the electro-optical material 1700 accordance with embodiments of the present invention. The incident rays 2502 are parallel and directed perpendicular to the incident uniform wavefronts 2402, shown in FIG. 24. On the other hand, the output rays 2504 are also perpendicular to the non-uniform wavefronts 2404 and represent the different propagating directions of electromagnetic waves transmitted through portions of the electro-optical material 1700. When proximate electromagnetic waves are approximately in phase, the electromagnetic waves constructively interfere. For example, electromagnetic waves 2506 and 2508 associated with proximate rays 2510 and 2512, respectively, represent waves that are approximately in phase and therefore interfere constructively. When proximate electromagnetic waves are approximately out of phase, the electromagnetic waves destructively interface. For example, electromagnetic waves 2514 and 2516 associated with rays 2518 and 2520, respectively, represent waves that are approximately out of phase and therefore interfere destructively.

Figure 26:
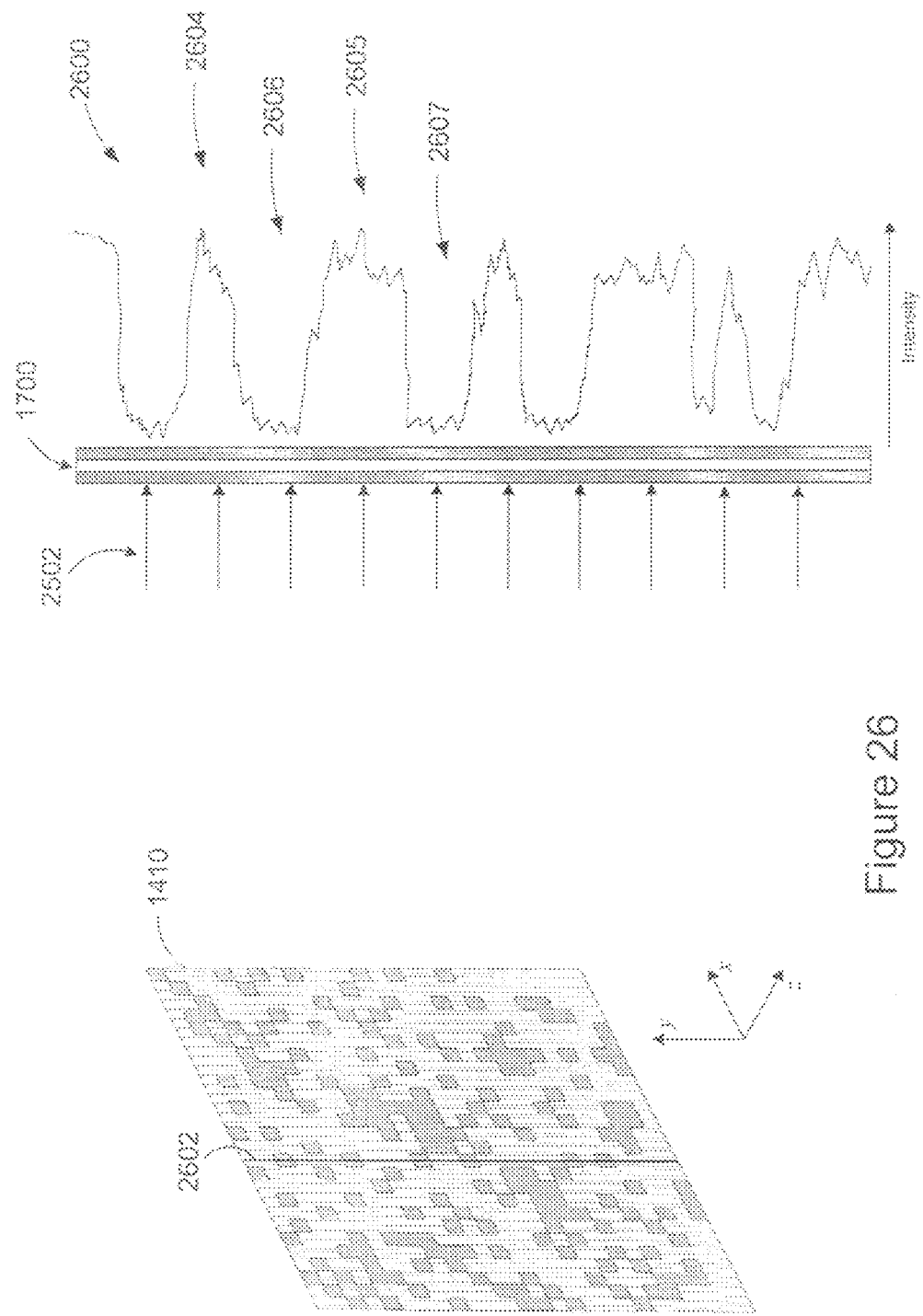
FIG. 26 shows an intensity pattern associated with a two-dimensional speckle pattern generated with the electro-optical material, shown in FIG. 17, in accordance with embodiments of the present invention.

The seemingly random constructive and destructive interference of electromagnetic waves transmitted through the electro-optical material 1700 generates a two-dimensional speckled pattern in the beam of electromagnetic radiation output from the electro-optical material 1700, such as the speckled pattern observed in the cross-sectional region 1410 described above with reference to FIG. 14. FIG. 26 shows an intensity pattern 2600 associated with a slice along a line 2602 in the y-direction of the two-dimensional speckle pattern 1410 in accordance with embodiments of the present invention. In FIG. 26, electro-optical material 1700 represents the electro-optical material 1402, shown in FIG. 14. Intensity peaks, such as peaks 2604 and 2605, correspond to constructively interfering electromagnetic waves transmitted through the electro-optical material 1700. In contrast, troughs, such as troughs 2606 and 2607, correspond to destructively interfering electromagnetic waves.

Figure 27:
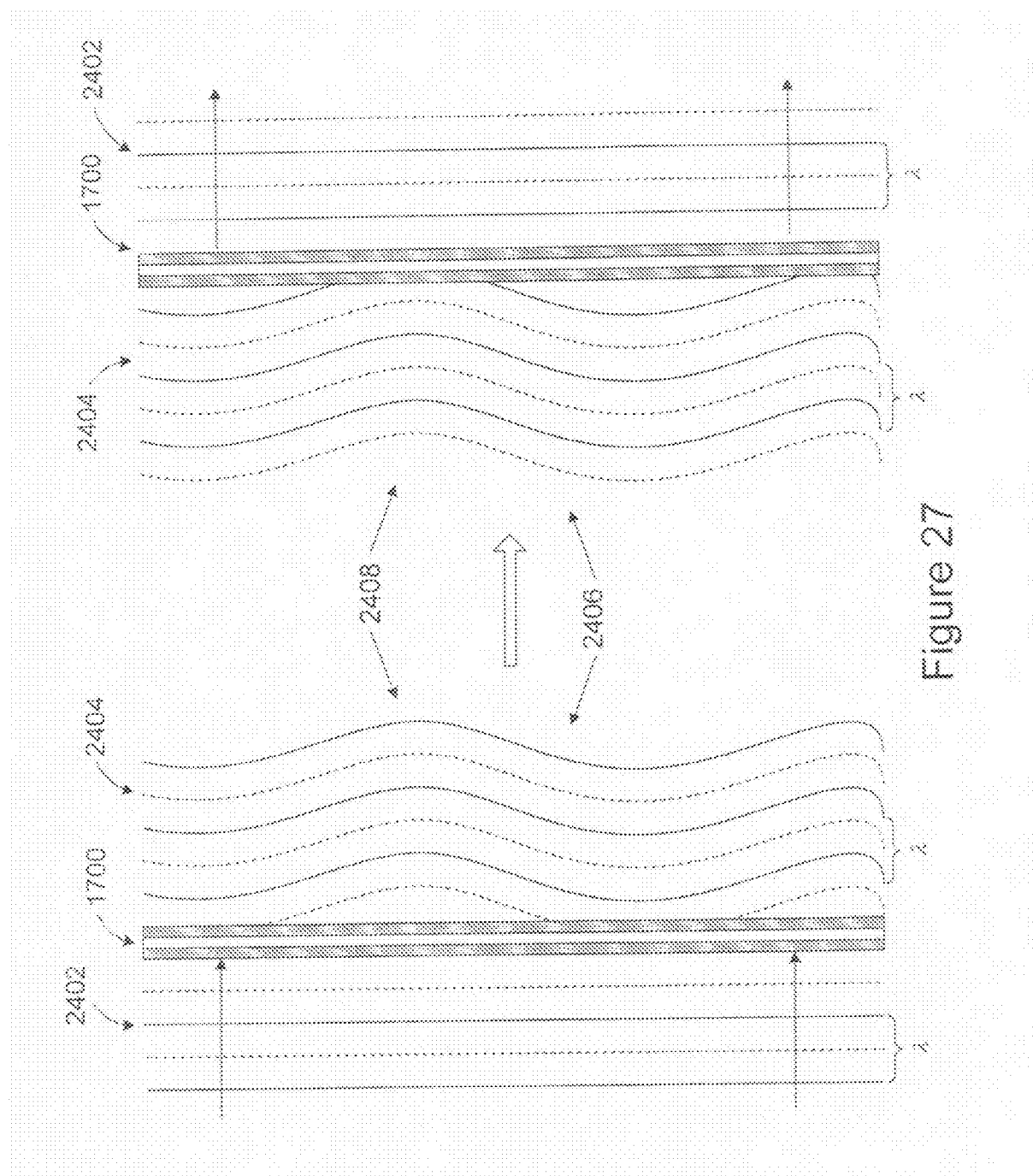
FIG. 27 shows a side view and schematic representation of a second electro-optical material configured and operated to remove a speckled pattern in a beam output from the electro-optical material, shown in FIG. 17, in accordance with embodiments of the present invention.

An electro-optical material can be operated to essentially remove the speckled pattern in a beam of coherent electromagnetic radiation generated by another electro-optical material. FIG. 27 shows a side view and schematic representation of a second electro-optical material 2700 configured and operated to remove the speckled pattern in the beam output from the electro-optical device 1700 in accordance with embodiments of the present invention. In the example shown in FIG. 27, the phase-modulation elements of the electro-optical material 2700 are electronically addressed to restore the uniform wavefronts 2402 in the beam transmitted through the electro-optical material 2700. For example, the electro-optical material 2700 is electronically addressed so that portions of wavefronts 2408 experience a relatively higher effective refractive index than portions of the wavefront 2406 in order to effectively restore the uniform wavefronts 2402.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A system for scrambling electromagnetic signals, the system comprising:
   an electronically reconfigurable electro-optical material; and
   a lens positioned and configured to direct a beam of electromagnetic radiation including one or more electromagnetic signals onto the electro-optical material, wherein the beam is transmitted through the electro-optical material, and the electro-optical material is electronically configured to introduce a two-dimensional speckled pattern into the cross-section of the beam such that data encoded in the one or more electromagnetic signals is scrambled.

2. The system of claim 1 further comprising a second lens positioned and configured to direct the beam of electromagnetic radiation transmitted through the electro-optical material.

3. The system of claim 1 wherein the electro-optical material further comprises a plurality of phase-modulation elements, each phase-modulation element having an associated electronically reconfigurable effective refractive index that introduces a transmission phase shift on a portion of the beam transmitted through the phase-modulation element.

4. The system of claim 1 wherein the two-dimensional speckled pattern further comprise a seemingly random distribution of intensities in the two-dimensional cross-section of the transmitted beam.

5. The system of claim 1 further comprising a scrambling control in electronic communication with the electro-optical material, the scrambling control configured to apply electronic signals to the phase-modulation elements of the electro-optical material so that portions of the beam experience different effective refractive indices.

6. The system of claim 1 wherein the electromagnetic signals further comprise amplitude encoded data or phase encoded data.

7. The system of claim 1 wherein the electro-optical material further comprises:
   a first layer of non-crossing approximately parallel nanowires, each nanowire having substantially regularly spaced fingers;
   a second layer of approximately parallel nanowires that overlay the nanowires in the first layer, each nanowire having substantially regularly spaced fingers, wherein the nanowires in the first layer are approximately perpendicular in orientation to the nanowires in the second layer; and resonant elements at nanowire intersections, wherein each resonant element includes two fingers of a nanowire in the first layer and two fingers of a nanowire in the second layer.

8. The system of claim 1 wherein the electro-optical material further comprises:
   a first layer of non-crossing approximately parallel nanowires;
   a second layer of non-crossing approximately parallel nanowires, each nanowire in the second layer overlaying the nanowires in the first layer; and an intermediate layer disposed between the first layer and second layer such that the refractive index of the intermediate layer at nanowire intersections changes in accordance with electronic signals applied to the intersecting nanowires in the first and second layers.

9. A system for descrambling data scrambled in a beam of electromagnetic radiation having a two dimensional speckled pattern, the system comprising:
   an electronically reconfigurable electro-optical material; and
   a lens positioned and configured to direct the beam of electromagnetic radiation onto the electro-optical material, wherein the speckled beam is transmitted through the electro-optical material, and the electro-optical material is electronically configured to remove the two dimensional speckled pattern from the beam revealing one or more electromagnetic signals encoding the data.

10. The system of claim 9 further comprising a second lens positioned and configured to direct the one or more electronic signals to a detector.

11. The system of claim 9 wherein the electro-optical material further comprises a plurality of phase-modulation elements, each phase-modulation element having an associated electronically reconfigurable effective refractive index that introduces a transmission phase shift on a portion of the beam transmitted through the phase-modulation element in order to convert a non-uniform wave front associated with the beam into an approximately uniform wave front.

12. The system of claim 9 wherein the two-dimensional speckled pattern further comprise a seemingly random distribution of intensities in the two-dimensional cross-section of the beam.

13. The system of claim 9 further comprising a descrambling control in electronic communication with the electro-optical material, the descrambling control configured to apply electronic signals to the electro-optical material that changes the effective refractive index associated with phase-modulation elements of the electro-optical material.

14. The system of claim 9 wherein the electro-optical material further comprises:
   a first layer of non-crossing approximately parallel nanowires, each nanowire having substantially regularly spaced fingers,
   a second layer of approximately parallel nanowires that overlay the nanowires in the first layer, each nanowire having substantially regularly spaced fingers, wherein the nanowires in the first layer are approximately perpendicular in orientation to the nanowires in the second layer; and resonant elements at nanowire intersections, wherein each resonant element includes two fingers of a nanowire in the first layer and two fingers of a nanowire in the second layer.

15. The system of claim 9 wherein the electro-optical material further comprises:
   a first layer of non-crossing approximately parallel nanowires;
   a second layer of non-crossing approximately parallel nanowires, each nanowire in the second layer overlaying the nanowires in the first layer; and
   an intermediate layer disposed between the first layer and second layer such that the refractive index of the intermediate layer at nanowire intersections changes in accordance with electronic signals applied to the intersecting nanowires in the first and second layers.

* * * * *